(12) United States Patent
Carvey et al.

(10) Patent No.: US 9,753,489 B2
(45) Date of Patent: Sep. 5, 2017

(54) PHYSICAL ELECTRONIC BULLETIN BOARD SYSTEM

(71) Applicant: General Enchantment LLC, Newton Centre, MA (US)

(72) Inventors: Andrew W. Carvey, Cambridge, MA (US); Robert Frigault, Bathurst (CA); Sarah Housman, Newton Centre, MA (US)

(73) Assignee: General Enchantment LLC, Boston, MA (US)

( * ) Notice: Subject to any disclaimer, the term of this patent is extended or adjusted under 35 U.S.C. 154(b) by 0 days.

(21) Appl. No.: 15/130,682

(22) Filed: Apr. 15, 2016

(65) Prior Publication Data

US 2016/0306384 A1   Oct. 20, 2016

Related U.S. Application Data

(60) Provisional application No. 62/148,630, filed on Apr. 16, 2015.

(51) Int. Cl.

| | |
|---|---|
| *G06F 1/16* | (2006.01) |
| *G06F 1/18* | (2006.01) |
| *G06F 1/26* | (2006.01) |
| *G06F 3/01* | (2006.01) |
| *G06F 3/041* | (2006.01) |
| *G06F 3/16* | (2006.01) |
| *G09F 15/00* | (2006.01) |
| *G09G 5/10* | (2006.01) |
| *G09G 5/12* | (2006.01) |

(Continued)

(52) U.S. Cl.
CPC .......... *G06F 1/1605* (2013.01); *G06F 1/1607* (2013.01); *G06F 1/188* (2013.01); *G06F 1/26* (2013.01); *G06F 3/017* (2013.01); *G06F 3/041* (2013.01); *G06F 3/147* (2013.01); *G06F 3/167* (2013.01); *G09F 15/00* (2013.01);

(Continued)

(58) Field of Classification Search
CPC ........ B43L 1/00; G06F 1/1605; G06F 1/1607; G06F 1/1611; A47B 97/001
See application file for complete search history.

(56) References Cited

U.S. PATENT DOCUMENTS

| | | | | |
|---|---|---|---|---|
| 5,328,145 | A | * | 7/1994 | Charapich ............ A47B 21/045 248/442.2 |
| 5,658,635 | A | * | 8/1997 | Davis ..................... A47B 97/04 40/793 |

(Continued)

FOREIGN PATENT DOCUMENTS

CN        201838206        5/2011

OTHER PUBLICATIONS

International Search Report and Written Opinion; International Application No. PCT/US16/22753; mailed Aug. 29, 2016; 16 pages.

*Primary Examiner* — Adrian S Wilson
(74) *Attorney, Agent, or Firm* — Fish & Richardson P.C.; Frank L. Gerratana

(57) ABSTRACT

Among other things, we describe a physical bulletin board. The bulletin board includes at least one physical component configured to interface with at least one electronic component. In some implementations, the bulletin board includes the electronic component, e.g., as a built-in display. For example, the built-in display may be associated with a processor that can run software that augments the functionality of the bulletin board. In some implementations, the bulletin board includes a component, such as a mounting apparatus, that receives a mobile computing device (MCD). For example, the MCD can run software that augments the functionality of the bulletin board.

20 Claims, 26 Drawing Sheets

(51) Int. Cl.
  *H04L 12/58* (2006.01)
  *H04L 29/08* (2006.01)
  *G06F 3/147* (2006.01)
  *G09G 3/00* (2006.01)
  *G09G 3/20* (2006.01)
  *G09G 5/00* (2006.01)
  *A47B 97/00* (2006.01)

(52) U.S. Cl.
  CPC ............... *G09G 3/001* (2013.01); *G09G 3/20* (2013.01); *G09G 5/00* (2013.01); *G09G 5/10* (2013.01); *G09G 5/12* (2013.01); *H04L 51/32* (2013.01); *H04L 67/2842* (2013.01); *A47B 97/001* (2013.01); *G09G 2354/00* (2013.01); *G09G 2370/02* (2013.01); *G09G 2370/022* (2013.01); *G09G 2370/06* (2013.01); *G09G 2370/16* (2013.01)

(56) References Cited

U.S. PATENT DOCUMENTS

| | | | |
|---|---|---|---|
| 5,987,825 A * | 11/1999 | Rosen | G09F 15/0068 40/107 |
| 6,686,900 B1 | 2/2004 | Levy et al. | |
| 6,690,912 B1 | 2/2004 | Vaughn | |
| 6,736,644 B1 | 5/2004 | Vaughn | |
| 7,293,993 B2 * | 11/2007 | Fedorov | G09F 7/04 434/408 |
| 7,743,112 B2 | 6/2010 | Kenna, III et al. | |
| 8,634,277 B2 | 1/2014 | Hoch et al. | |
| 8,675,354 B2 | 3/2014 | L'Henaff | |
| 2001/0037593 A1 * | 11/2001 | Korpai | G06F 1/1607 40/594 |
| 2002/0023237 A1 | 2/2002 | Yamada et al. | |
| 2002/0086703 A1 | 7/2002 | Dimenstein et al. | |
| 2003/0053127 A1 * | 3/2003 | Wu | G06F 3/1204 358/1.15 |
| 2005/0022439 A1 * | 2/2005 | Crump | G09F 1/12 40/711 |
| 2005/0191611 A1 * | 9/2005 | Owen | A47B 97/001 434/408 |
| 2007/0077815 A1 * | 4/2007 | White | B43K 23/001 439/607.01 |
| 2008/0166915 A1 * | 7/2008 | Kendall | H01R 31/06 439/527 |
| 2012/0225622 A1 | 9/2012 | Kudrna et al. | |
| 2012/0268878 A1 | 10/2012 | Smith | |
| 2015/0366349 A1 * | 12/2015 | Ross | G06F 1/16 361/679.58 |

* cited by examiner

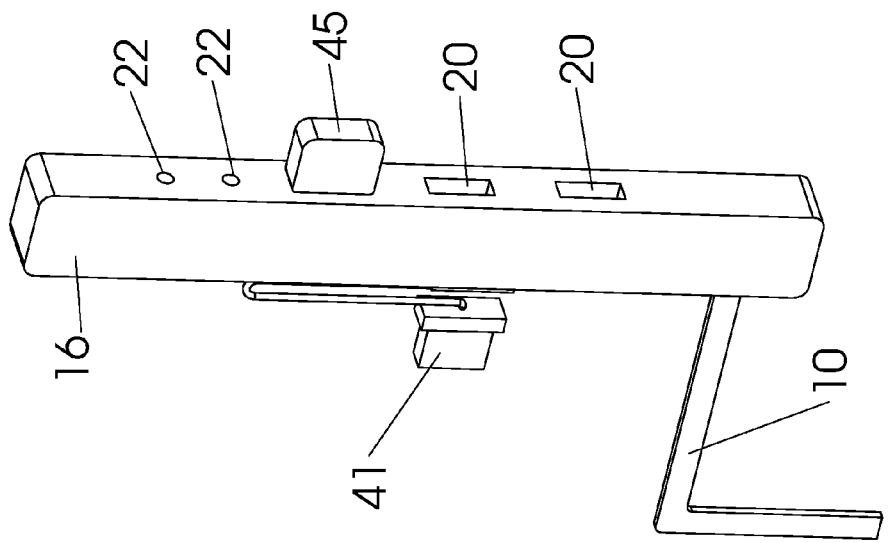
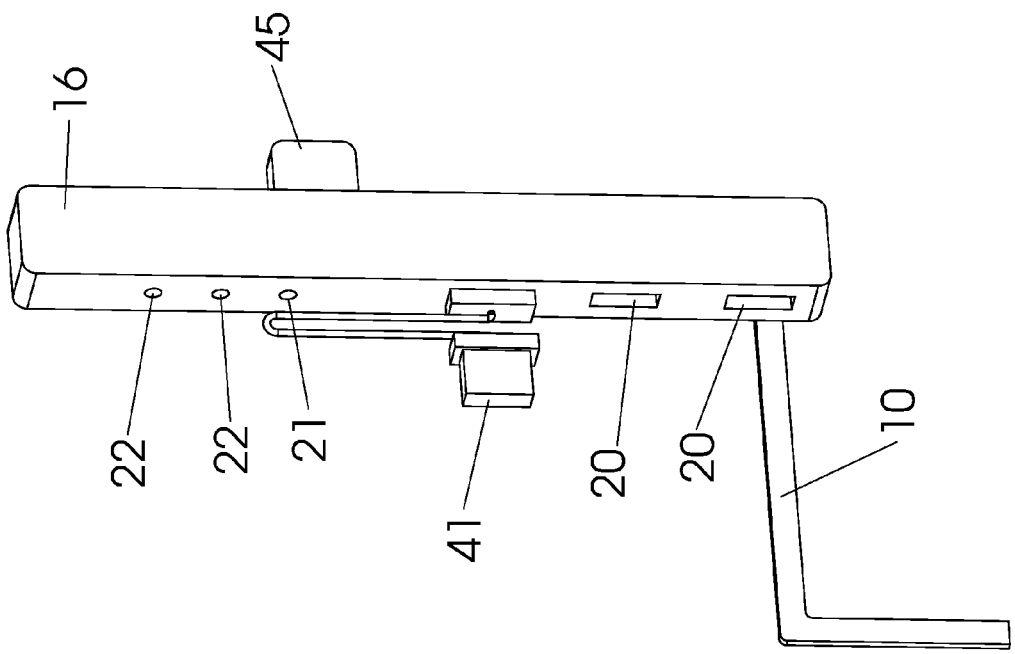

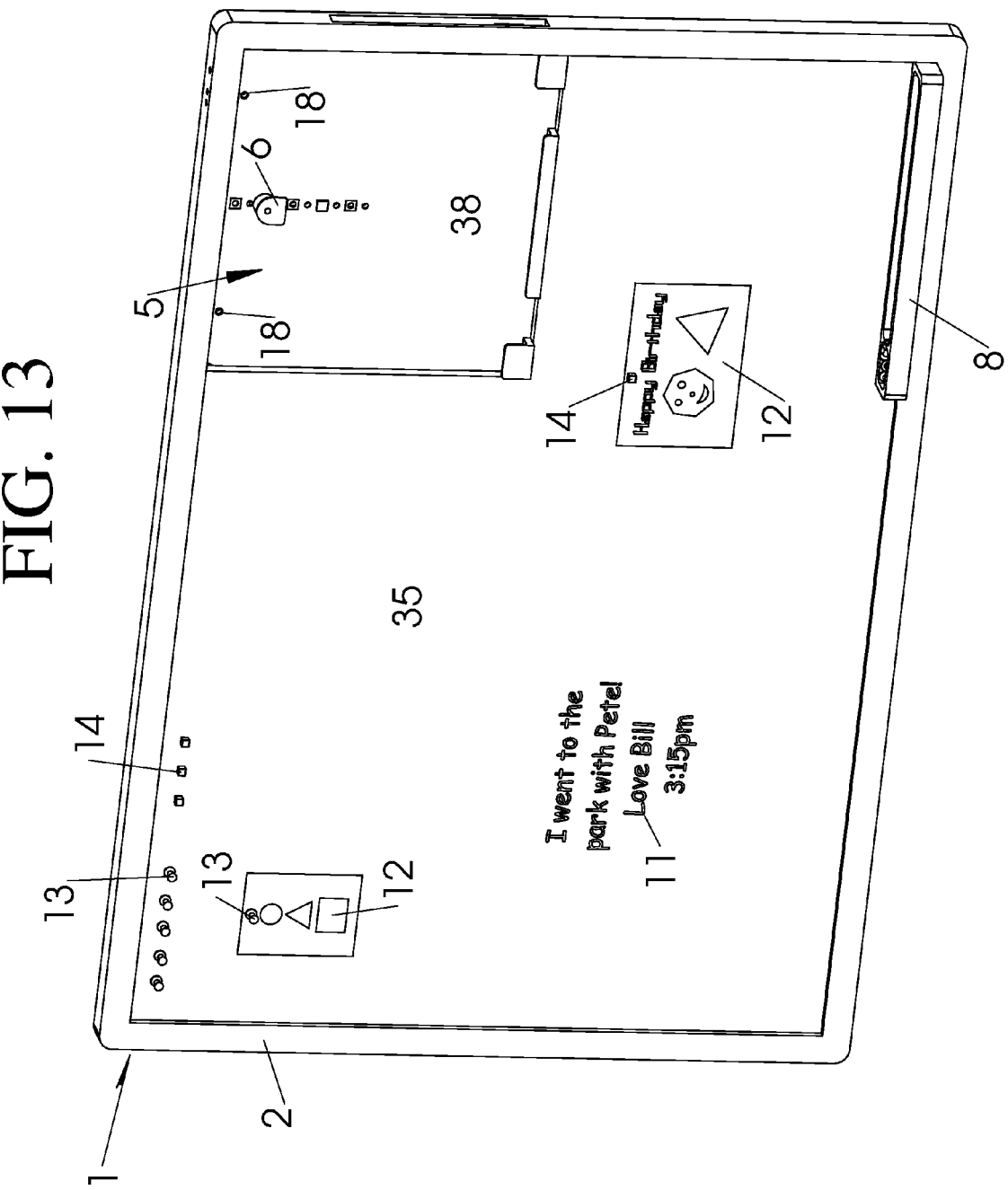

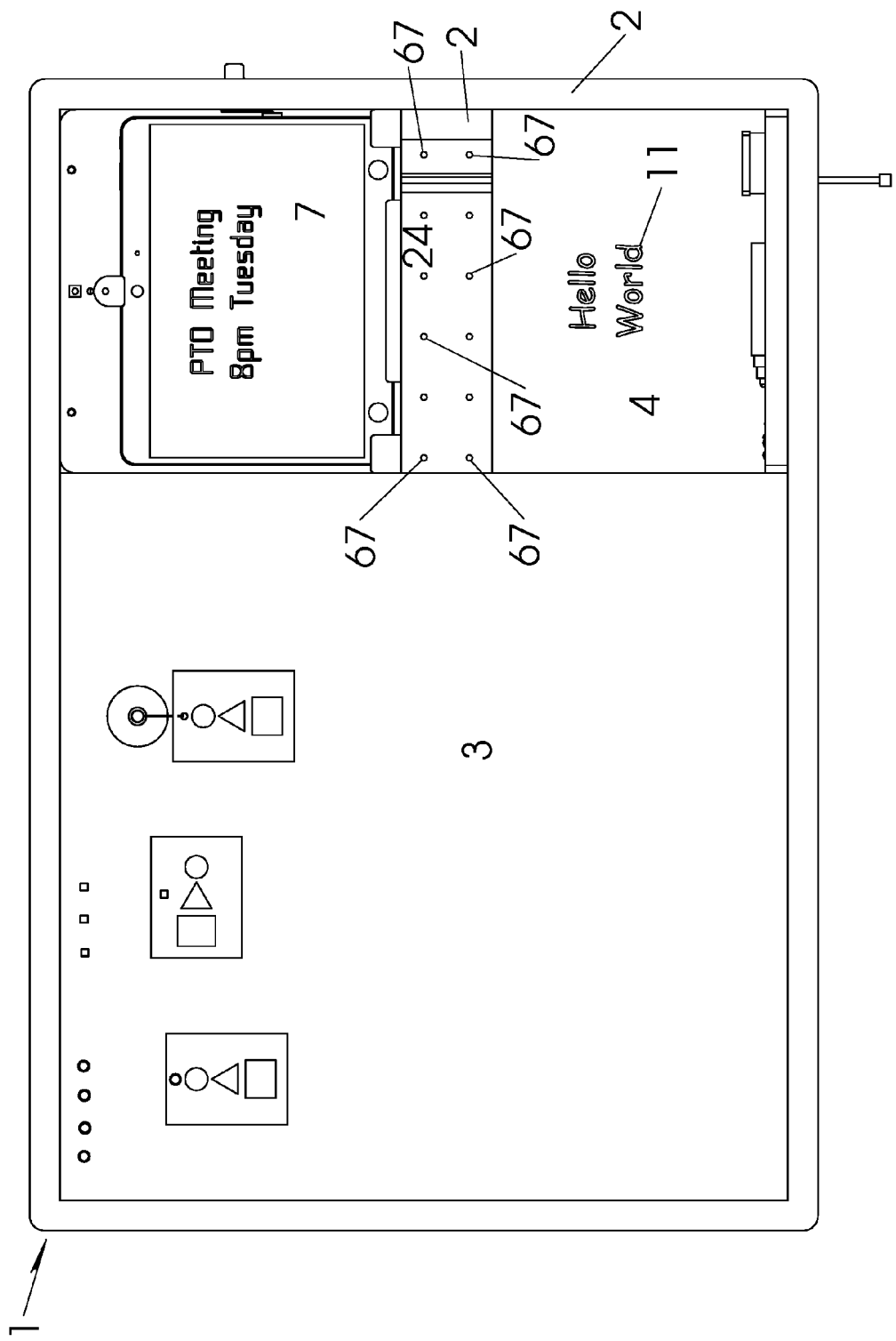

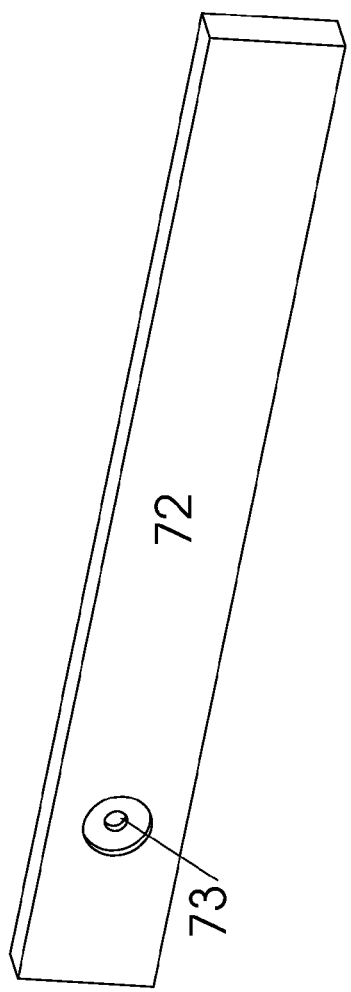
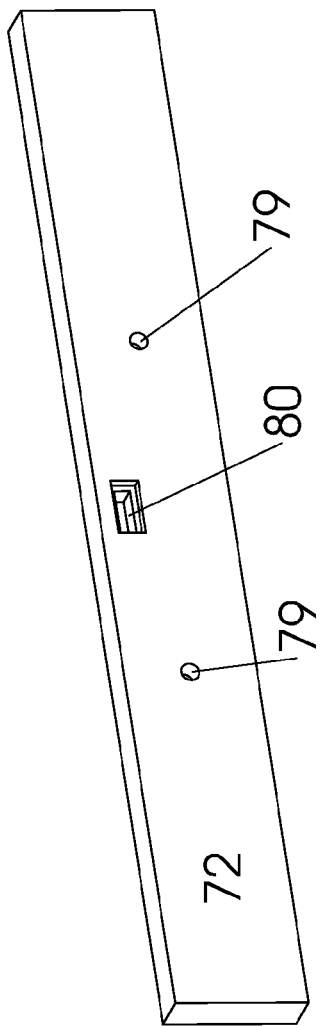

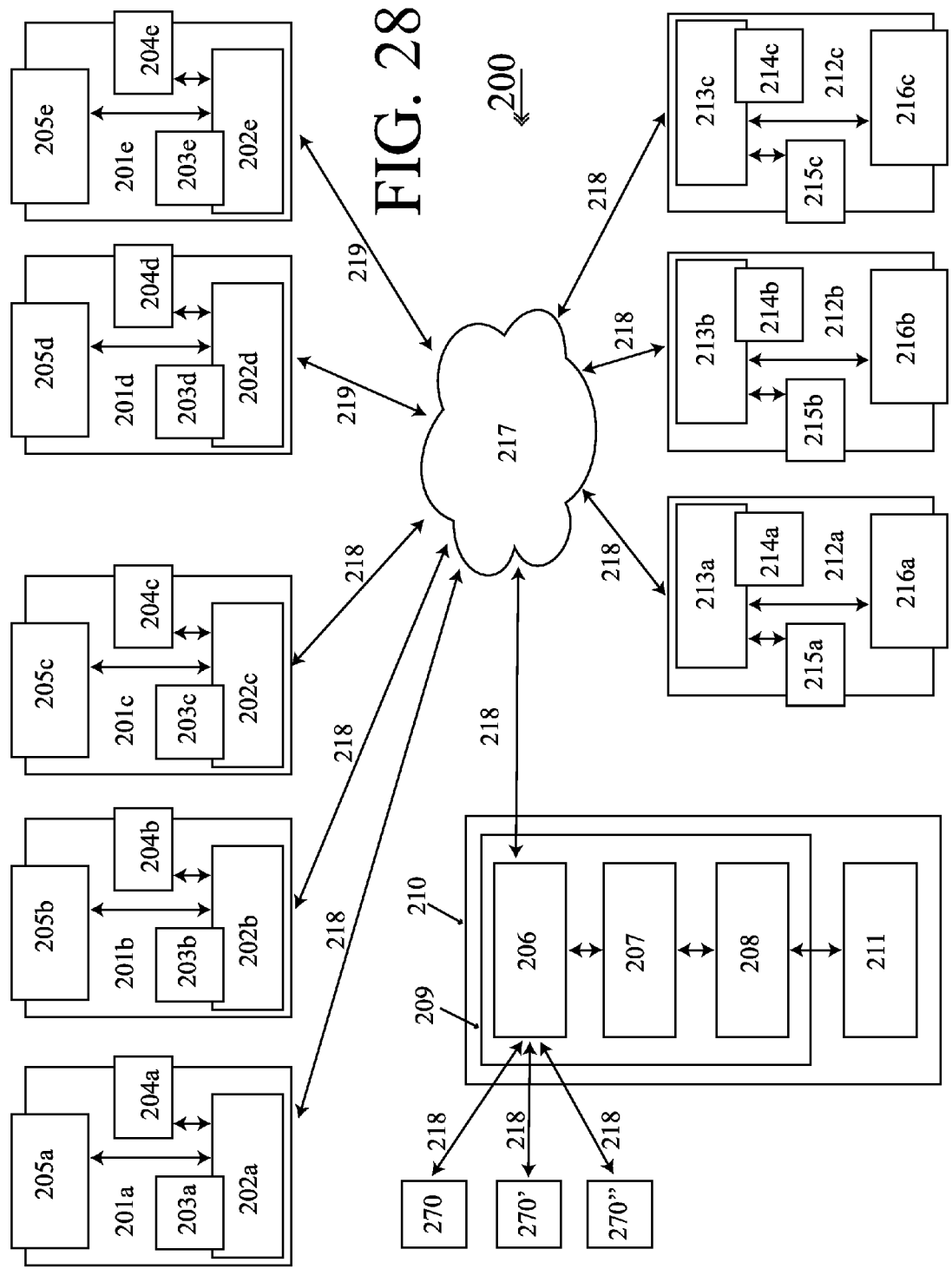

PHYSICAL ELECTRONIC BULLETIN BOARD SYSTEM

CROSS-REFERENCE TO RELATED APPLICATION

This application has the benefit of the filing date of U.S. provisional application 62/148,630, filed Apr. 16, 2015, and incorporated in its entirety here by reference.

BACKGROUND

This description relates to a bulletin board. A wide variety of visual bulletin display devices have been implemented into shared spaces to post communal information, achievements and memories. Traditional messaging devices such as bulletin or cork boards, chalk or dry-erase boards, calendars, or pen and paper, each have their inherent method of recording information at a physical location and visually displaying information. Life can become very busy, and schedules can vary drastically amongst family members that are on-the-go resulting in less shared quality time together with loved ones than desired.

SUMMARY

Among other things, we describe a physical bulletin board. The bulletin board includes at least one physical component configured to interface with at least one electronic component. In some implementations, the bulletin board includes the electronic component, e.g., as a built-in display. For example, the built-in display may be associated with a processor that can run software that augments the functionality of the bulletin board. In some implementations, the bulletin board includes a component, such as a mounting apparatus, that receives a mobile computing device (MCD). For example, the MCD can run software that augments the functionality of the bulletin board.

Some implementations improve sharing information (physical, digital and ideas) within a family and other household members or other households (or other people/places in general) in order to more effectively connect and coordinate with each other. Some implementations include a system and apparatus for displaying in-home social digital signage which allows bulletins and information to be posted and written on both physical surfaces and in the electronic digital domain for shared viewing and interaction in one or more locations.

DESCRIPTION OF DRAWINGS

FIGS. 8a and 8b are isometric view configurations of a powered data connection hub for use in a combination bulletin board with MCD compartment.

FIG. 13 is an isometric view configuration of combination bulletin board with MCD compartment having a surface of visual bulletin posting and view, a MCD holder and a utility holder.

FIG. 16 is a front view configuration of a combination bulletin board with MCD compartment showing an area capable of attaching add-on modules.

FIGS. 21a and 21b shows two isometric view configurations of a projector add-on module for use with a combination bulletin board with MCD compartment.

FIG. 28 is a block diagram of a configuration of the social digital signage system.

DETAILED DESCRIPTION

Figure 1:
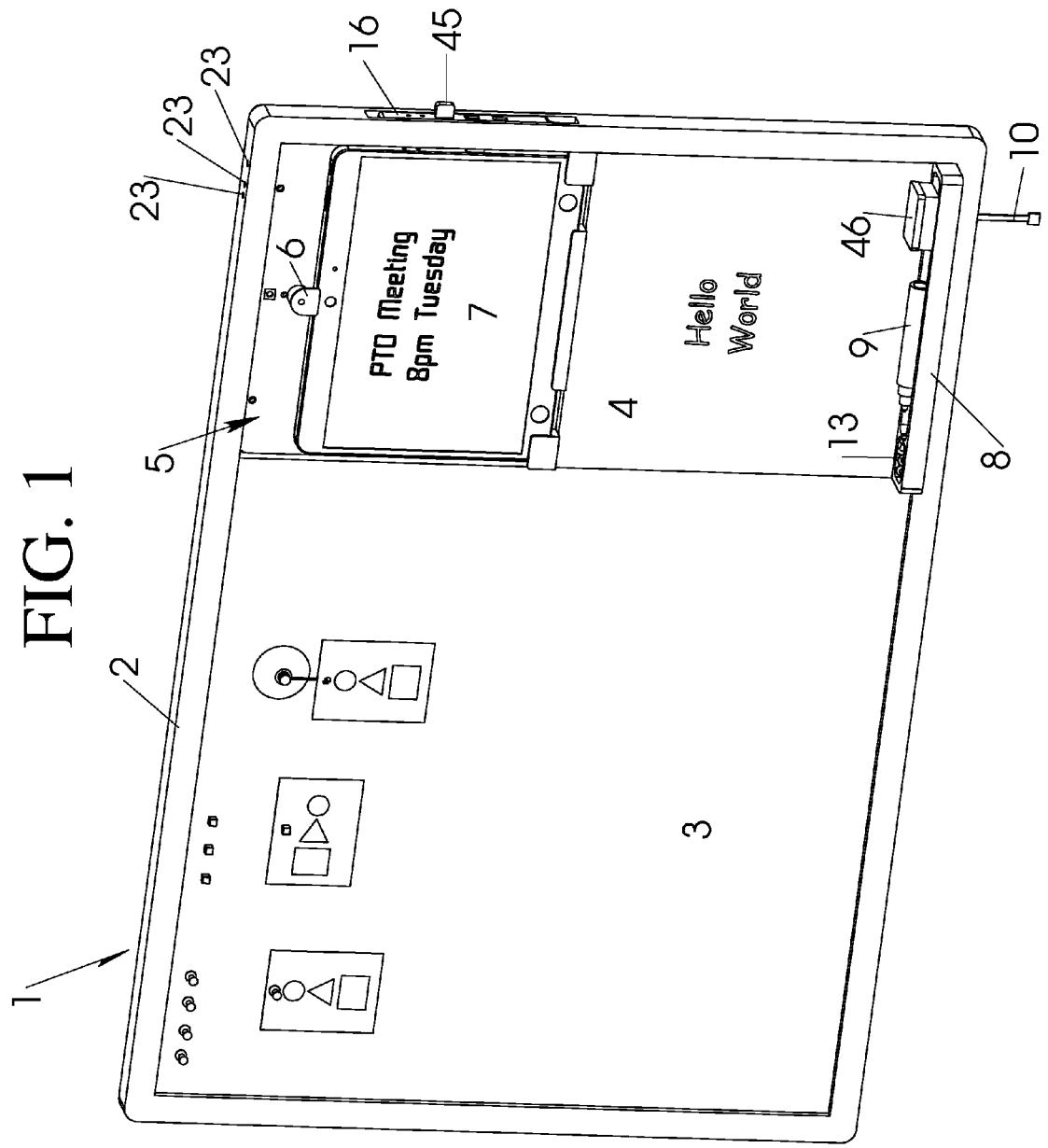
FIG. 1 is an isometric view configuration of a combination bulletin board with MCD compartment having a cork board, a chalkboard, a MCD holder, a utility holder, a powered docking hub and a RF communication dongle.

Among other things, we describe a bulletin display device which allows the posting or attaching of physical objects, writing or drawing on an easily erasable surface, and the input and output of visual and auditory data via an electronic device that can be easily shared with other users, e.g., via a secure social network.

In some implementations, a digitally enhanced bulletin board for home use includes a backing, a frame, a cork board, chalk/white board, a container for holding writing utensils, and a compartment containing an internet enabled computing display system executing software used for in-home digital signage that socially connects members of groups on a secure network. The frame includes a powered docking hub, a docking connector and other utilities to operate the computing display system such as physical extensions for buttons which enable control of the ON/OFF state or the volume of the computing system mounted to the frame, a digitally connected external camera capable of capture images of posted content to the bulletin board for transmission to other networked devices, an attached camera for digital shared-space interaction, a microphone and external speakers for the capture and playback of audio, and other function augmenting add-ons. Proprietary digital signage software which augments the functionality of a traditional bulletin board to operate as in-home digital signage can include utilities to prevent the computing display system from powering down, user defined scheduling, sharing digital bulletins with authorized users within the network, view configuration management, and switching to the digital signage application following specified periods of inactivity. Use of the bulletin board can include a mobile and web application which allows content to be posted onto the digitally enhanced bulletin board from multiple locations.

Some implementations improve sharing information (physical, digital and ideas) within a family and other household members or other households (or other people/places in general) in order to more effectively connect and coordinate with each other. Some implementations include a system and apparatus for displaying in-home social digital signage which allows bulletins and information to be posted and written on both physical surfaces and in the electronic digital domain for shared viewing and interaction in one or more locations.

Some implementations include an augmentation of a traditional bulletin message center with the addition of a mobile computing device (MCD) which is connected to a social network that complements the system where the non-electronic message center is lacking. Some implementations allow for the posting and display of physical content bulletins in a central common location to a physical surface, writing and drawing on an easily erasable surface for posting, viewing and interacting with an electronic display device which has the capability of accepting tactile input, capturing audio and visual images, storing data locally, audio playback, communication with an external server which allows information to be posted to and displayed on remote visual display units (VDUs) or MCDs across the network. An MCD can include devices such as tablet computers, smartphones, and other devices of a similar size and/or form factor.

Messaging devices such as bulletin or cork boards, chalk or dry-erase boards, calendars, or pen and paper, each have their inherent method of recording and visually displaying information at a physical location, yet may also have limitations. In order to improve effective communication amongst closed social groups such as families, physical bulletin posting devices can benefit by either being augmented or replaced by digital technology. A coextensive digital medium more effectively disseminates information across physical distances and can improve personal connections. The addition of mobile information sharing to traditional fixed-location messaging devices also allows faster communication between multiple entities and locations. The enhanced bulletin board with Social Digital Signage System will improve traditional physical bulletin board functionality by allowing the sharing of information with members within a group such as a family who do not have present access to their physical bulletin board.

In some implementations, the bulletin board has a compartment which assigns a MCD/VDU a fixed location home in a central location that augments the traditional use of a non-digital message center.

Some implementations include additional functionality such as charging the MCD/VDU, cellular phones, and/or rechargeable batteries, playing music, providing accent lighting, and producing pleasing and/or relaxing odors. (e.g., NYC garbage smell released to remind you to take out the trash)

In some implementations, the bulletin board provides a central location to post and view physical messages, view digital messages that were generated both locally and remotely, post digital messages locally and to remote locations, and post digitized physical messages to remote locations.

In some implementations, the Social Digital Signage System allows bulletins to be created that would otherwise not be possible for a non-electronic bulletin board, such as: audio recorded messages, instant digital images and video messages, information extracted from a real-time feed (such as weather conditions), and automatically generated messages relevant to the users' life based upon pre-defined filters and preferences. The Social Digital Signage System can then instantly share these digital messages with the people who have physical access to the message center and others who are presently at different remote locations, and with other users on the social network who do not have physical access to the bulletin board.

In some implementations, gesture-based non-contact hand motions to control the digital display allow interaction with the device while hands are dirty, soapy, or covered in cooking creation (meat juices/cookie batter).

In some implementations, in a first aspect, the bulletin board includes a structural backing upon which two sections are defined, and a means of attaching the structural backing and its joint sections to a mounting surface or wall. The first section has a non-electronic surface that allows bulletins to be easily displayed, composed of a material selected from the group that allows the attachment of physical objects/bulletins via interference, adhesion, magnetism, compression, binding, expansion, or suction; or the writing of text based messages and/or the drawing of glyphs on an easily erasable surface (unpowered or powered), an easily removable surface and/or replaceable surface, or a surface which allows visibly coherent overlay graphic composition. The second section is comprised of a mobile computing device holder that secures a mobile computing device to the bulletin board via physical interference, passive suction, a clamp/binder or expander that generates a holding force, magnetism, and/or adhesion.

In some implementations, in a second aspect, the bulletin board includes a structural backing upon which three sections are defined along with an attached container, a means of attaching the structural backing and its joint sections to a mounting surface or wall, and a raised framing wall encompassing/surrounding the sections and container along the perimeter of the structural backing. The first section has a non-electronic surface that allows items to be easily attached, a second section comprised of a writing surface that easily allow writing and drawing, and the third section is comprised of a MCD holder. The container is capable of holding items such as chalk, dry-erase markers, pencils, pens, erasers or other writing utensils, and/or pins, tacks, magnetics, suction cups, clips or other attachment mechanisms.

In some implementations, in a third aspect, the bulletin board includes a structural backing upon which three sections are defined along with an attached container, a means of attaching the structural backing and its joint sections to a mounting surface or wall, and a docking connector mounted to the backing which is coupled with a powered docking hub, and a raised framing wall. The first section has a non-electronic surface that allows items to be easily attached, a second section comprised of a writing surface that easily allow writing and drawing, and the third section is comprised of a mobile computing device holder.

The docking connector allows a MCD/VDU contained in the third section to be powered and digitally coupled to a powered docking hub. The powered docking hub allows additional electronic devices to be powered and potentially communicate with the coupled mobile computing device.

In some implementations, in a fourth aspect, the bulletin board includes a structural backing upon which three sections are defined along with an attached container, a means of attaching the structural backing and its joint sections to a mounting surface or wall, a docking connector coupled with a powered docking hub, add-on accessories, and a raised framing wall. The first section has a non-electronic surface that allows items to be easily attached, a second section comprised of a writing surface that easily allow writing and drawing, and the third section is comprised of a mobile computing device holder. The docking connector allows a held MCD/VDU to be powered and digitally coupled to a powered docking hub.

The powered docking hub allows additional electronic devices such as digital add-on accessories to be powered and potentially communicate with a coupled MCD/VDU. The add-on accessories may be selected from the group consisting of items such as speakers, microphones, cameras, an optical digital scanner, digital image projectors, RF communication dongles, accent lighting, key holders, a bottle opener, a phone holder, and/or an odor dispenser.

In some implementations, in a fifth aspect, the bulletin board includes a structural backing upon which three sections are defined along with an attached container, a means of attaching the structural backing and its joint sections to a mounting surface or wall, a docking connector coupled with a powered docking hub, a mobile computing device coupled to the docking connector, a raised framing wall, and a social network system which allows the mobile computing device to serve as a digital signage display. The first section has a non-electronic surface that allows items to be easily attached, a second section comprised of a writing surface that easily allow writing and drawing, and the third section is comprised of a holder which contains a MCD/VDU.

The docking connector allows the held MCD/VDU to be digitally coupled to a powered docking hub. The powered docking hub allows additional electronic devices such as digital add-on accessories to be powered and potentially communicate with the coupled mobile computing device.

In some implementations, in a sixth aspect, the social digital signage system includes the held MCD/VDU coupled to the bulletin board and connected to a host web and application server via a bidirectional secure internet connection, a host data storage server, and a host service provider computer {workstation}.

A client-server system for the management of users, access to software controls for system administrators, managers and publishers, and distribution of digital bulletins to client computing devices within a network of computing devices. Client software for presenting "digital bulletins" on the display screen of the MCD/VDU registered with the social digital signage system using local settings per device controlling the owner's preferred and approved bulletins for display. Publishing software available on the held MCD/VDU that orchestrates the relationships between publishers of bulletins and access to published or approved bulletins.

Software allows the user to choose pre-created content to display, edit chosen content & create new content for display. The user can control when specific content is displayed and for what duration. The software also allows 3rd Party applications to be run within the software framework.

In some implementations, in a seventh aspect, the bulletin board includes a structural backing upon which three sections are defined along with an attached container, a means of attaching the structural backing and its joint sections to a mounting surface or wall, a docking connector coupled with a powered docking hub, a MCD/VDU coupled to the docking connector, a raised framing wall, and a social network system which allows the MCD/VDU to serve as a digital signage display in addition to communicate with devices and authorized users within the network. The first section has a non-electronic surface that allows items to be easily attached, a second section comprised of a writing surface that easily allow writing and drawing, and the third section is comprised of a holder which contains a MCD/VDU. The docking connector allows the held MCD/VDU to be digitally coupled to a powered docking hub. The powered docking hub allows additional electronic devices such as digital add-on accessories to be powered and potentially communicate with the coupled mobile computing device.

The social network system is comprised of the held MCD/VDU coupled to the bulletin board and connected to a host web and application server via a bidirectional secure internet connection, a host data storage server for storing user data that can be distributed if desired to authorized users, a host service provider computer (e.g., a workstation), and additional computing devices securely connected to the network via the internet and/or mobile phone network.

Some implementations include a client-server system for the management of users, access to software controls for system administrators, managers and publishers, and distribution of digital bulletins to client computing devices within a network of computing devices.

Some implementations include client software for presenting "digital bulletins" on the display screen of computing devices registered with the social bulletin board network using local settings per device controlling the owner's preferred and approved bulletins for display. Publishing software available on computing devices (mobile and/or on the computing device registered to present bulletins) that orchestrates the relationships between publishers of bulletins and access to published or approved bulletins on sets of registered computing devices in the network.

Some implementations include software allows the user to create, edit or choose pre-created content for display on devices authorized within the network. The user can control when specific content is displayed and for what duration. This allows users to share content to other devices' displays, which can be incorporated into other users' display timeline. The software also allows 3rd Party applications to be run within the software's framework.

In some implementations, in an eighth aspect, the bulletin board includes a structural backing upon which two sections are defined, along with an attached container, a means of attaching the structural backing and its joint sections to a mounting surface or wall, a powered docking hub, a raised framing wall, software, and a secure network system. The first section has a non-electronic surface that allows bulletins to be easily displayed, and the second section is comprised of an integrated computing display system further comprised of a controller which can receive and transmit electronic data, an electronic visual display device coupled to said controller that displays electronic content provided and/or generated by said controller, at least a controller data storage device for storing data received and/or generated by said controller, a means of powering said electronics, at least a data connection port capable of transmitting and receiving data from external devices, at least a tactile input device (capturing/accepting user input), at least an audio record/playback device, at least a device capable of capturing visual images, at least a button, and a component which allows bidirectional communication and/or secure bidirectional communication between said controller and a secure network. The powered docking hub is connected to the controller, allowing additional electronic devices such as digital add-on accessories to be powered and to communicate with the controller. The integrated computing device can securely communicate bidirectionally with a social network system which allows the integrated computing device to serve as a digital signage display in addition to communication with other devices and authorized users within the network.

In some implementations, in a ninth aspect, the bulletin board includes a structural backing upon which three sections are defined along with an attached container, a means of attaching the structural backing and its joint sections to a mounting surface or wall, a docking connector coupled with a powered docking hub, a MCD/VDU coupled to the docking connector, a raised framing wall, a social network system which allows the MCD/VDU to function as a digital signage display, and a wirelessly connected external camera. The first section has a non-electronic surface that allows items to be easily attached, a second section comprised of a writing surface that easily allow writing and drawing, and the third section is comprised of a holder which contains a mobile computing device. The external camera is mounted such that it can capture an image of bulletin board at regular intervals and securely transfer the capture image to the computing device. Software being run on the computing device allows images of new posted bulletins to be digitally isolated and optioned to be shared with other users on the social network.

In some implementations, in a tenth aspect, the bulletin board includes structural backing upon which two sections are defined, a means of attaching the structural backing and its joint sections to a mounting surface or wall, and a raised framing wall. The first section has a non-electronic surface that allows bulletins to be easily displayed, and the second section is comprised of an internet enabled electronic visual display (e.g., coupled to a controller) capable of secure communication with a social network which allows the display to function as in-home digital signage via software being executed on the controller. In some examples, this version acts as a WiFi digital picture frame+bulletin board that can mirror displayed content of another electronic display.

In some implementations, in an eleventh aspect, the bulletin board includes a structural backing upon which two sections are defined, a means of attaching the structural backing and its joint sections to a mounting surface or wall, a raised framing wall, a social digital signage network system, and a non-connected external projector and camera system with internet enabled control unit which allows the projected image to serve as a digital signage display. The first section has a non-electronic surface that allows bulletins to be easily displayed, and the second section is comprised of a material that allows projected images to be clearly viewed. The external projector and camera system are mounted such that an image can be projected onto the second section's surface, and the camera can capture images of the entire bulletin board at regular intervals. Software being run on the control unit allows images of new posted bulletins to be digitally isolated and optioned to share with other users on the social network. The control unit runs digital signage software and is connected to a social digital signage system which allows the posting and sharing of bulletins with other authorized users. The camera has the ability to capture images of physical posted bulletins, digitally crop the image in preparation for optioned sharing with other desired users.

In some implementations, in a twelfth aspect, the bulletin board is modular and includes interconnecting sections which each have a specific functionality that complements the other sections in order to improve the total functionality of the whole system. Each modular section is comprised of a structural backing (or frame) that has at least a connecting apparatus (feature) which allows the modular section to be easily structurally secured to either the other modular sections and/or a common unifying member. The modular sections are held together by one or more of the following methods: physical interference, adhesion, magnetism, clamping or expansion such that a holding force is generated, and/or passive suction. Each modular section can be independently secured to a mounting surface.

In some examples, the modular system has two core foundation modules. The first modular section contains a non-electronic surface that allows bulletins to be easily displayed, composed of a material selected from the group that allows the attachment of physical objects/bulletins via interference, adhesion, magnetism, compression, binding, expansion, or suction; or the writing of text based messages and/or the drawing of glyphs on an easily erasable surface (unpowered or powered), an easily removable surface and/or replaceable surface, or a surface which allows visibly coherent overlay graphic composition. The second modular section allows the containment of an internet enabled computing display system which allows control via a tactile and/or non-contact gesture recognition interface.

Auxiliary modular sections may be selected from the following list to be connected together:
- Mounting feature to attach the modular system to a mounting surface
- A holder for auxiliary support tools (chalk, pins, eraser, etc)
- Powered docking hub
- Speakers, microphone, camera, accent lighting, video/image projector, odor dispenser, printer, scanner, etc.
- Framing or visual aesthetic improvement
- Phone charger, key holder, jacket hook(s), additional interface controls, etc
- Proprietary modules that are created by 3rd Party vendors
- External WiFi camera capable of communicating with the modular computing device The internet enabled computing display system can connect to a social network which allows the sharing of bulletins in the digital domain.

A useful feature of a module system is that it easily allows the bulletin board to be different sizes in order to accommodate the space constraints of the user.

In some implementations, in a thirteenth aspect, the bulletin board includes a holder for a mobile computing device (MCD) (tablet) that can be mounted to a corkboard, and social digital signage software run on a mounted MCD that allows posting and sharing of bulletins via a social digital signage network.

In some implementations, in a fourteenth aspect, the bulletin board includes a system for transmitting and displaying electronic bulletins. A client-server system for the management of users, access to software controls for system administrators, managers and publishers, and distribution of digital bulletins to client computing devices within a network of computing devices. Client software for presenting "digital bulletins" on the display screen of computing devices registered on the social digital signage system using local settings per device controlling the owner's preferred and approved bulletins for display. Publishing software available on computing devices (mobile and/or on the computing device registered to present bulletins) that orchestrates the relationships between publishers of bulletins and access to published or approved bulletins on sets of registered computing devices in the network.

In some examples, the host server system includes:
- Forms based process to register or modify registration settings for a computing device with the network as a board available for publishing bulletins to including:
- Establishment of a unique identifier of the board
- Assignment of the account admin. Owner able to manage controls for bulletins published to the board,
- Naming/Defining/Declaring of the board for approved users to identify as a location to publish to In some examples, a forms based process for establishing relationships between registered users enables members of the network access to publish on specific boards including:
- Discovery of existing members in the network
- Invitation to members to publish to boards owned by another member
- Invitation to non-members to register to establish an account in order to publish to one or more boards
- Approval and assignment of permission to registered members to post bulletins or photos to a board owned by a member of the network In some examples, a management system for controlling different categories of bulletin available for posting includes a library of dynamic templates for bulletins including:
- Formatted photographs
- Key events
- Dynamic content such as weather or news
- Advertisements or coupons/offers
- Tasks and task lists
- Configuration of 3rd Party content
- Gather data/information from the API of 3rd Party applications In some examples, storage management of content and permissions incorporated into bulletins includes:
- Cache of photographs
- Digital Bulletins authored using client software across multiple types of media
- Subscriptions to streams of remote content such as photo streams, social media status updates, or text such as RSS or Twitter
- Cache of remote content based on user settings
- Permission to access or include bulletins or other content items such as photographs or templates in boards other than the owner's board.

In some examples, a processing system to subscribe to data feeds to translate data feeds into bulletins includes:
- Store username and password and other key parameters to establish automated access to data feeds comprised of:
- Text, photos, calendars, tasks, news, and videos
- Ability to translate calendar items automatically into key events including assignment of templates for presentation as a bulletin. For example translate the text describing a calendar item of "soccer practice—Zach" to automatically generate a bulletin with an image of a soccer player published the day before the soccer practice as a reminder on the board of practice.
- Management to pull only specific subsets of data into sets of bulletins such as selecting only the last 50 photos or only poll remote sites on a specified period such as daily or weekly.

In some examples, clients to view/display bulletins can perform operations including:
- Displays the bulletins in a slide type manner with one bulletin available at a time taking the entire screen to present the content
- Scheduling manager to turn on presentation mode automatically at specified times and to present specified channels of bulletins
- Utility to prevent common power saving modes for computing devices from automatically entering into hibernate, dimmed, sleep mode where it is unable to present bulletins
- Presentation of additional content within the viewer in panels that present content in addition to the main slide show view to present additional content from an alternative stream of smaller bulletins
- Link through interactive bulletin feature to launch external applications from bulletins based on viewed content and source
- Manual management to advance or go backwards in a sequence of bulletins through interaction with the screen or other input device
- The option to group bulletins into sets to present and share the sets with others.

In another aspect, a social network based digital signage system allows owners and managers of an enhanced bulletin board or computing device to publish digital bulletins to one or more devices within a network.

In some implementations, the software contains three elements:

1. A client-server system for the management of users, access to software controls for system administrators, managers and publishers, and distribution of digital bulletins to client computing devices within a network of computing devices.

2. Client software for presenting "digital bulletins" on the display screen of computing devices registered with the social bulletin {board} network using local settings per device controlling the owner's preferred and approved bulletins for display.

3. Publishing software available on computing devices (mobile and/or on the computing device registered to present bulletins) that orchestrates the relationships between publishers of bulletins and access to published or approved bulletins on sets of registered computing devices in the network.

In some examples, the server system includes:
Forms based process to register or modify registration settings for a computing device with the network as a board available for publishing bulletins to including:
   Establishment of a unique identifier of the board
   Assignment of the account owner able to manage controls for bulletins published to the board
   Assignment of the board for approved users to identify as a location to publish.

In some examples, a forms based process for establishing relationships between registered users that enables members of the network access to publish on specific boards includes:
   Discovery of existing members in the network
   Invitation to members to publish to boards owned by another member
   Invitation to nonmembers to register to establish an account in order to publish to one or more boards
   Approval and assignment of permission to registered members to post bulletins or photos to a board owned by a member of the network.

In some examples, a management system for controlling available bulletin types available for posting including a library of dynamic templates for bulletins includes:
   Formatted photographs
   Key events
   Dynamic content such as weather or news
   Advertisements or coupons/offers
   Tasks and task lists.

In some examples, storage management of content and permissions incorporated into bulletins includes:
   Cache of photographs
   Bulletins authored using client software across multiple types of media
   Subscriptions to streams of remote content such as photo streams, social media status updates, or text such as RSS or Twitter
   Cache of remote content based on policy set by users
   Permissions for access to include bulletins or other content items such as photographs or templates in boards other than the owner's board.
   Processing system to subscribe to data feeds to translate data feeds into bulletins.

Some techniques include storing username and password and other key parameters to establish automated access to data feeds including:
   Text, photos, calendars, tasks, news, and videos
   Ability to translate calendar items automatically into key events including assignment of templates for presentation as a bulletin. For example translate the text describing a calendar item of "soccer practice Zach" to automatically generate a bulletin with an image of a soccer player published the day before the soccer practice as a reminder on the board of practice
   Management to pull only specific subsets of data into sets of bulletins such as selecting only the last 50 photos or only poll remote sites on a specified period such as daily or weekly.

In some examples, clients to view/display bulletins perform operations including the following:
   Displays the bulletins in a slide type manner with one bulletin available at a time taking the entire screen to present the content
   Scheduling manager to turn on presentation mode automatically at specified times and to present specified channels of bulletins
   Utility to prevent common power saving modes for computing devices from automatically entering into hibernate, dimmed, sleep mode where it is unable to present bulletins
   Presentation of additional content within the viewer in panels that present content in addition to the main slide show view to present additional content from an alternative stream of smaller bulletins
   Link through interactive bulletin feature to launch external applications from bulletins based on viewed content and source
   Manual management to advance or go backwards in a sequence of bulletins through interaction with the screen or other input device
   The option to group bulletins into sets to present and share the sets with others.

The term "network" as used herein is a telecommunications network which allows computers to exchange data, includes both networks and internetworks of all kinds, the Internet and cellular phone networks, and is not limited to any particular network or inter-network.

The family communications may take the form of "bulletins" as that term is commonly understood, where a traditional bulletin is created and maintained in the physical domain, and a digital bulletin in electronic form. A bulletin or bulletin collection may include text and graphics arranged to be visually attractive and convey information pertinent to family life activities. Traditional bulletins include all forms of visual communication including graphics, written and printed text along with photographs, visual works and artistic material displayed either alone or in any combination. The term "digital bulletin" as used herein means data distributed on storage media, or otherwise, without regard to the form or content thereof, and including but not limited to audio, video, text, images, animations, web pages and streaming media data.

As used in this application, the term "digital bulletins" shall be understood as customizable electronic content created, designed, ordered, modified and scheduled by registered administrators and publishers from templates [preloaded by the provider] relevant to a variety of communications including but not limited to announcements, calendar events, images, text, combinations of images and text, tasks, widgets (such as Twitter), video, RSS feeds.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

Referring now to the drawings, wherein like reference numerals designate corresponding structure throughout the views.

Figure 3:
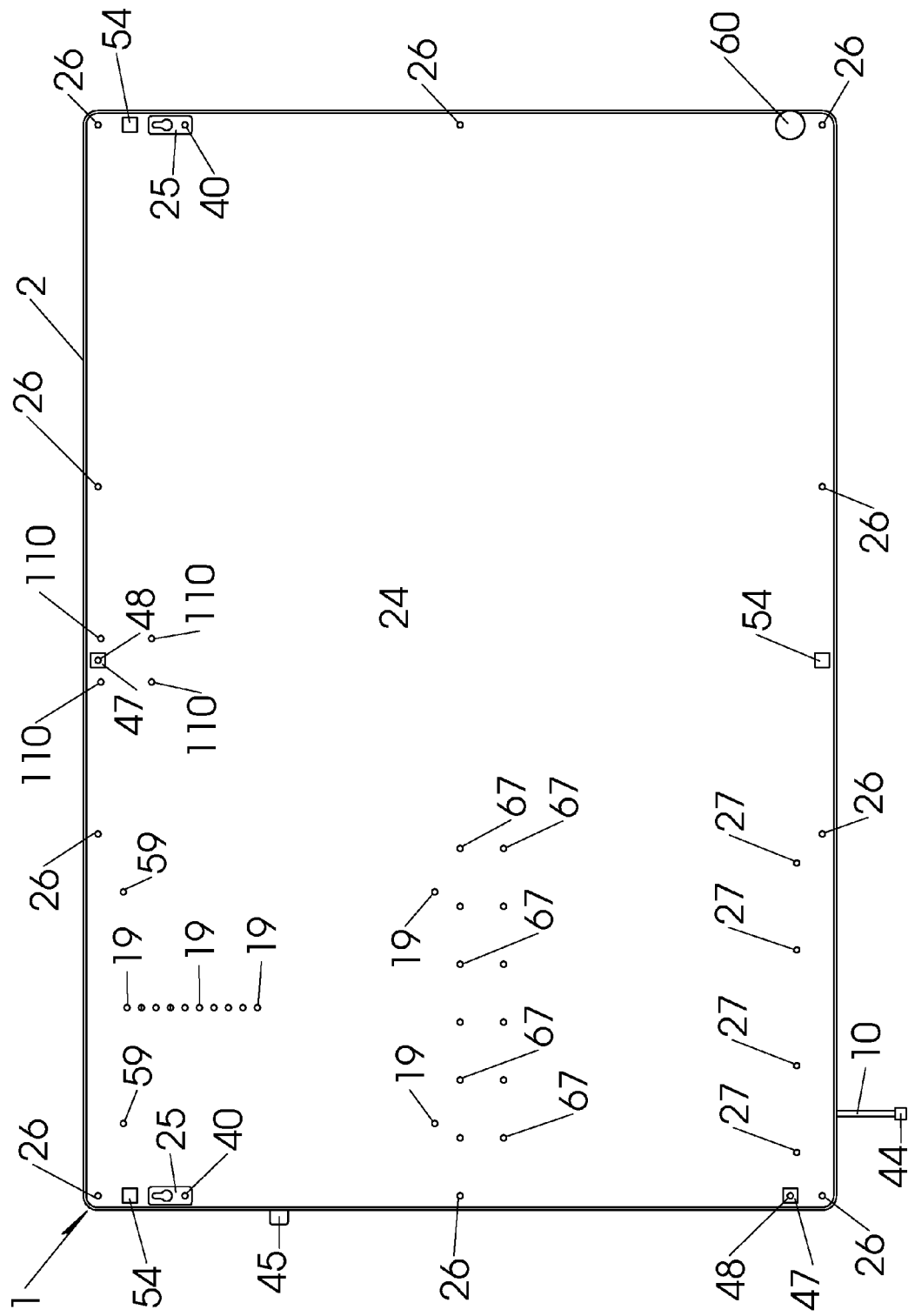
FIG. 3 is a back view configuration of a combination bulletin board with MCD compartment showing the thin base backing and mounting apparatus.

FIG. 1 illustrates a mobile computing device case 1. The mobile computing device case 1 includes a unifying structural member comprised of a framing wall 2 and/or a thin base member 24 (FIG. 3). On the frontal viewing side of the bulletin board, the encompassing framing wall 2 and the perimeter of the thin base member 24 preferably contain an extruded surface of visual bulletin posting and viewing 35 (FIG. 13) defining the first section, a mobile computing device (MCD) holding system 5 (FIG. 13) defining the second section, a MCD 7 contained by the MCD holding system 5 and partially retained by the MCD retaining entity 6, a utility device holder 8 defining the third section, and a powered data connection hub 16 with RF communication dongle 45. FIG. 1 embodies the compartmentalized surface of visual bulletin posting and viewing 35 (FIG. 13) subdivided into the sections named the surface of easy attachment 3 and the writing surface 4.

Figure 2:
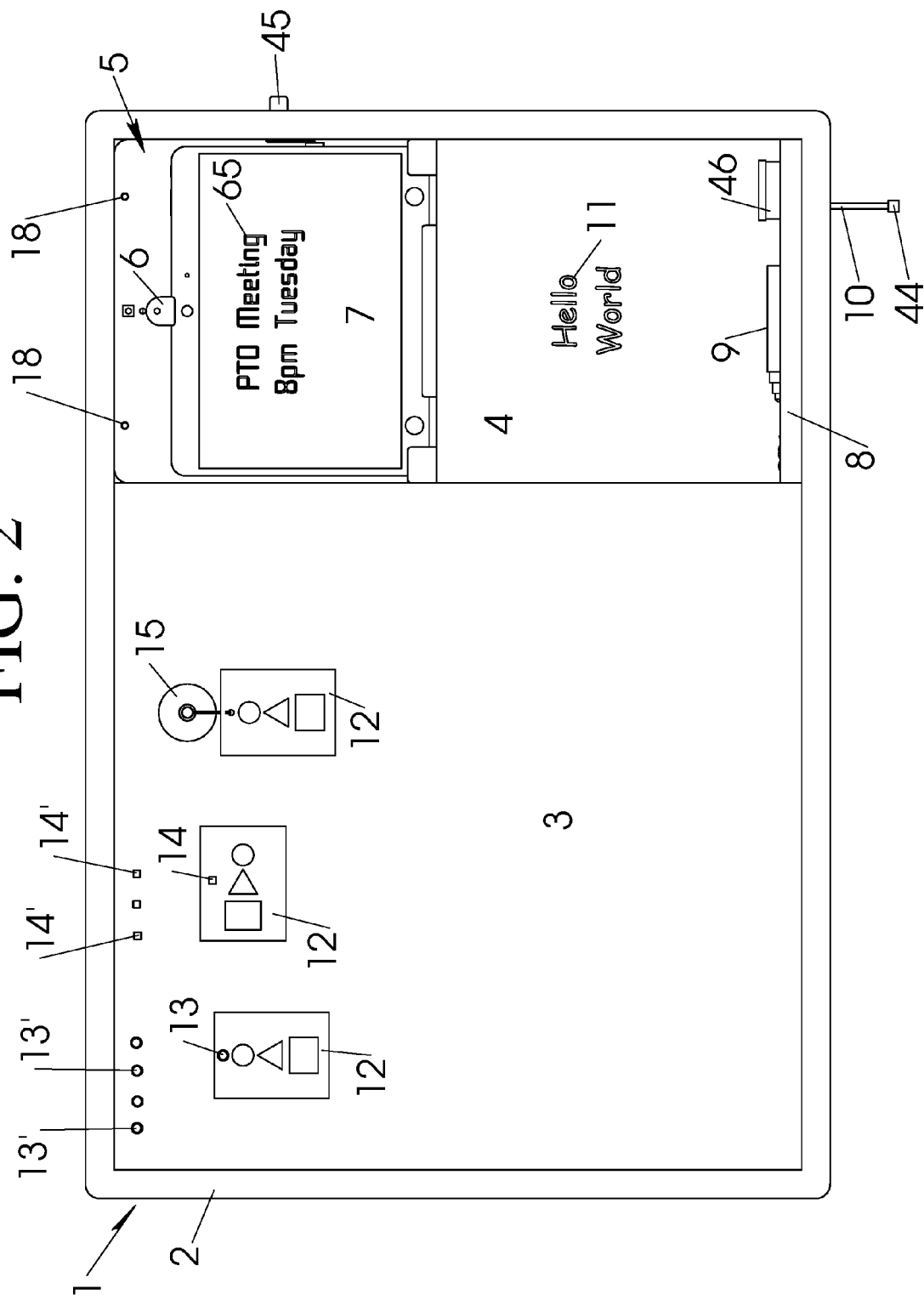
FIG. 2 is a front view configuration of a combination bulletin board with MCD compartment having a cork board, a chalkboard, a MCD holder, a powered docking hub, utility holder and RF communication dongle.

The surface of visual bulletin posting and viewing 35 (FIG. 13) allows differing categories of bulletins to be posted to said surface dependent upon said devices material composition. The surface of visual bulletin posting and viewing 35 (FIG. 13) can be of any size, shape or orientation, and may be further divided to provide additional extruded sections to aid in user ease of bulletin posting and viewing. The surface of visual bulletin posting and viewing 35 may be divided into an extruded section capable of having bulletins attached to the surface 3 and a writing surface 4 which can be easily erased, replaced or overwritten. Physical bulletins 12 can be attached to the surface of easy attachment 3 using attachment utensils 13, 14 and/or 15, temporarily contained within the utility device holder 8 or affixed to the surface of easy attachment 3 as shown in FIG. 2 by attachment apparatus 13' and 14'. Written bulletins 11 can be scribed/posted onto the writing surface 4 using a writing utensil 9 temporarily held in the utility device holder 8, and erased/removed using a erasing utensil 46 also held in/on the utility device holder 8.

The surface of easy attachment 3 is composed of a material that allows physical bulletins 12 to be quickly secured and/or removed from the surface 3 which is composed of a material such as cork, felt, soft rubber or other easily penetrable material capable of being easily pierced, hook & loop, a ferrous or smooth metal, glass or plastic surface, a pressure sensitive adhesive surface, or any combination of two or more of the aforementioned. Bulletins can be secured to the surface of easy attachment using attachment apparatus 13, 14 and/or 15 such as thumb tacks, push-pins, staples, magnets, suction-cups, binding clips, hook and loop, tape and/or sticky pressure sensitive adhesive.

The writing surface 4 allows bulletins to be scribed using a writing utensil 9, and easily erased by either unpowered means such as an erasing utensil 46, or powered means such as a change in EM field. The writing surface 4 is composed of a material such as an erasable board, a LCD writing tablet, smooth metal, glass or plastic, or may also be a surface which is easily removed and eventually replaced to reveal a new surface beneath such as sticky notes, pads or sheets of paper that is held in place by physical interference, adhesion, magnetism, binding, suction, or a combination of two or more of the aforementioned.

Figure 4:
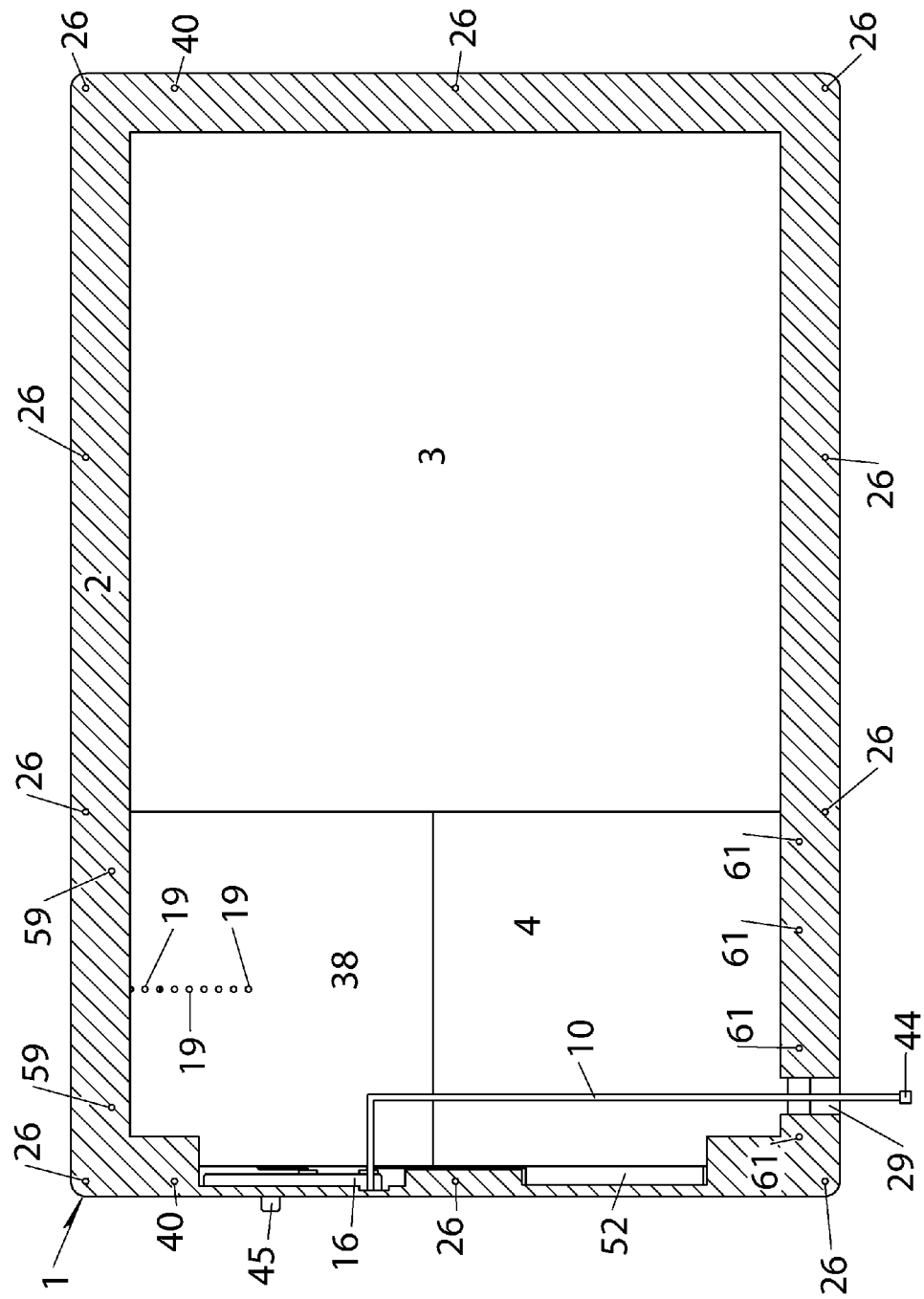
FIG. 4 is a back section view configuration of a combination bulletin board with MCD compartment showing components hidden by the thin base backing.

The utility device holder 8 is secured to the thin base backing 24 (FIG. 3) via the utility device holder attachment holes 27 (FIG. 3) and fasteners, and potentially secured to the framing wall 2 using a glue, adhesive or via the utility device holder attachment fasteners 61 (FIG. 4). The utility device holder 8 (FIG. 1) is compartmentalized to allow the containment of attachment utensils 13, 14 and 15, a writing utensil 9 such as chalk, marker, pen pencil, stylus, crayon or other surface marking instrument, and the containment or holding of an erasing utensil 46 composed of a material such as a felt block, a sponge, a fibrous swatch, or other ink absorbing materials.

Figure 6:
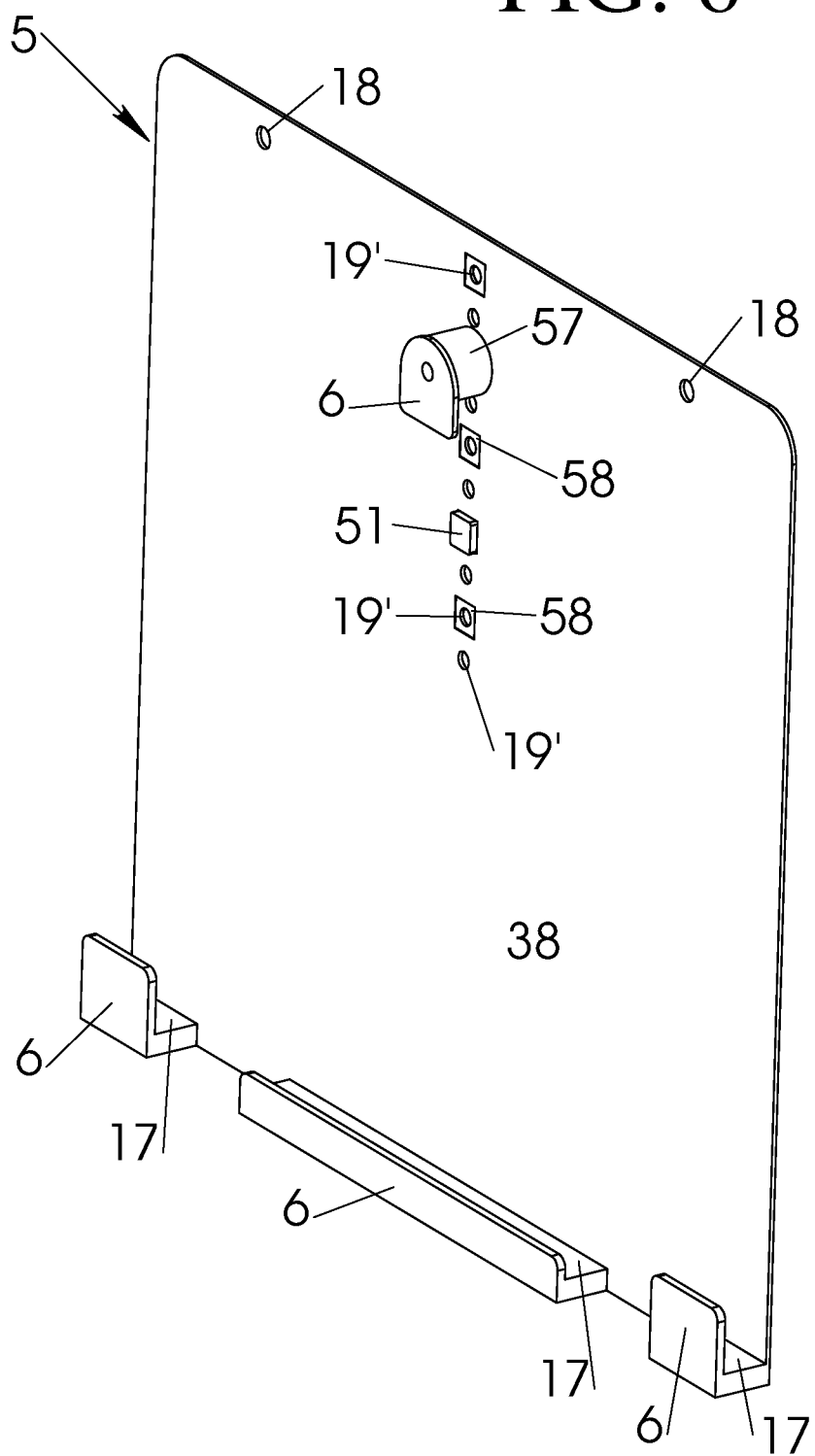
FIG. 6 is an isometric view configuration of a stand-alone MCD holder system for use in a combination bulletin board with MCD compartment.
Figure 7:
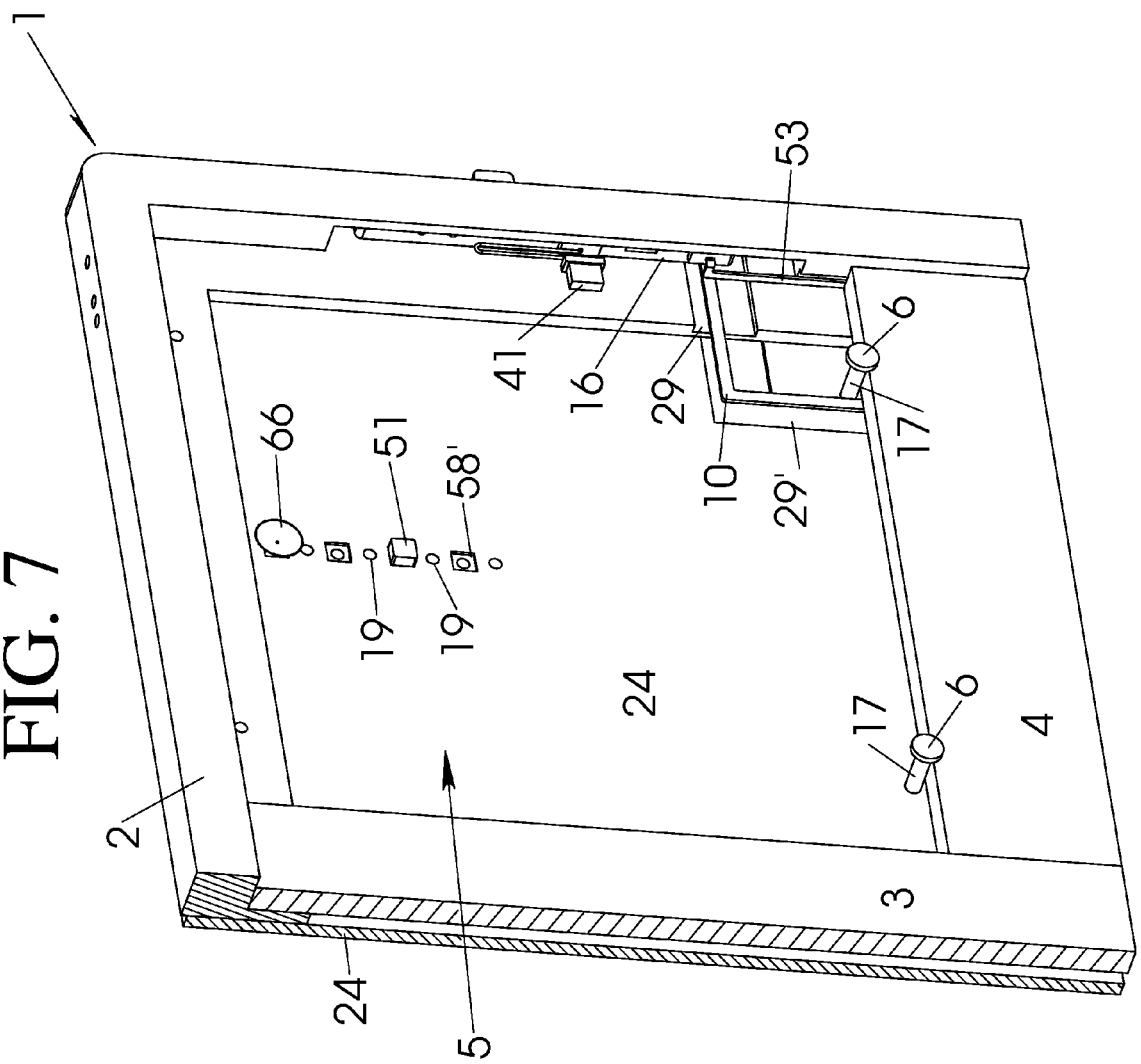
FIG. 7 is an isometric section view configuration of a MCD holder system integrated with the structural members.

The mobile computing device holding system 5 (FIG. 6) can exist in two configurations: Free-mounting (FIG. 6) or Integrated (FIG. 7), and both hold a mobile computing device within the bulletin board for use by the user. The free-mounting mobile computing device holder 5 (FIG. 6) includes a mobile computing device holder backing 38, having at least a support member 17 protruding from the bottom of the surface of the computing device holder backing that has a retaining surface 6 extending from the support member 17 to contain the MCD close to the backing, in addition to a MCD holder anchor feature 18 to attach the MCD holder to either the bulletin board framing wall 2 and/or the thin base backing 24. A MCD holder support member 17 may be implemented in order to support the MCD against gravitational fields. Adjustment holes 19' in a spaced array in the MCD holder backing 38 allow an assembly comprised of a standoff 57 and MCD retaining surface 6 to be secured to the MCD holder backing 38 at different location in order to accommodate different sized MCDs, allowing the MCD to be held in the bulletin board using physical interference, while allowing the MCD retaining surface to rotate such to allow the MCD to be removed from the holder and the bulletin board. Anchor recesses 58 aid in securing MCD retaining entities 51 such as magnets, pressure sensitive adhesive surfaces or a section hook and loop to hold the MCD within the bulletin board; passive suction devices can be retained in the adjustment holes 19'. A magnetic MCD retaining entity can generate a holding force on a ferrous surface of the MCD or a ferrous surface which was secured to the MCD for means of securing the MCD within the bulletin board; a hook and loop MCD retaining entity functions similarly. A MCD retaining entity composed of a pressure sensitive adhesive surface can generate a holding force on a MCD surface that has an adhesive compliant surface, securing the MCD within the bulletin board. A passive suction device 66 (FIG. 7) acting as a MCD retaining entity can generate a holding force on a MCD surface that is smooth and non-porous securing the MCD within the bulletin board. These aforementioned MCD retaining entity configurations allow a MCD to be securely held by the bulletin board while still being easily removable by the user.

The integrated MCD holder (FIG. 7) has many of the same components as the free-mounting MCD holder 5 (FIG. 6), however the integrated MCD holder uses the thin base backing 24 instead of including the MCD holder backing 38. The integrated MCD holding system includes MCD holder support member 17 affixed to either the thin base backing 24 via the MCD retaining entity anchor feature holes 19 (FIG.

3), or as an integrated feature of the framing wall, with MCD retaining surface 6 projecting from the end opposite the thin base backing 24. The thin base backing 24 contains adjustment holes 19 in a spaced array with possibility for anchor recesses 58' aid in securing MCD retaining entities 51 such as magnets, pressure sensitive adhesive surfaces or a section of hook and loop to hold the MCD within the bulletin board; passive suction devices can be retained in the adjustment holes 19. A magnetic MCD retaining entity can generate a holding force on a ferrous surface of the MCD or a ferrous surface which was secured to the MCD for means of securing the MCD within the bulletin board. A pressure sensitive adhesive surface as a MCD retaining entity can generate a holding force on a MCD surface that has a adhesive compliant surface, securing the MCD within the bulletin board. A passive suction device 66 as a MCD retaining entity can generate a holding force on a MCD surface that is smooth and non-porous securing the MCD within the bulletin board. These aforementioned MCD retaining entity configurations allow a MCD to be securely held by the bulletin board while still being easily removable by the user. The adjustment holes 19 can also allow for an assembly comprised of a standoff 57 (FIG. 6) and MCD retaining surface 6 (FIG. 6) to be secured to the thin base backing 24 at different location in order to accommodate different sized MCDs; hold the MCD in the bulletin board using physical interference for containment, while allowing the MCD retaining surface to rotate such to allow the MCD to be removed from the holder and the bulletin board.

In some examples, variations of the MCD holder system are possible in order to achieve the holding force required to secure the MCD within the bulletin board; a plurality of adjustment holes 19 aligned in arrays may be implemented, or the MCD holder support members 17 and the MCD retaining surfaces 6 (FIGS. 6 and 7) may be exchanged for additional MCD retaining entities 51, or the MCD support wall(s) 17 may be exchanged for a clamping apparatus which generates a holding force for the MCD, or the support wall(s) 17 and retaining surface(s) 6 may be formed from reliefs or features of the framing wall(s) 2.

In some examples, variations of the MCD holder system can be of any size, shape, orientation or spacing required to accommodate the insertion and extraction of the desired mobile computing device secured to the bulletin board.

In some examples, the configuration of the sections and their positions in the tray relative to one another can be changed and each section may be rearranged in any orientation to provide the features of the bulletin board.

With reference to FIG. 3, the thin base backing 24 is secured to the framing wall 2 (FIG. 1) by the backing attachment anchor features 26, and to the utility device holder 8 (FIG. 1) by the utility device holder attachment fasteners 27. In some examples, the thin base backing 24 includes multiple methods of attaching the bulletin board to a mounting surface. The thin base backing 24 contains passive suction apparatus 60 in suction anchor features 48, mounting recesses 47 to aid in securing mounting apparatus 54 such as magnets, pressure sensitive adhesive surfaces or hook and loop to the bulletin board 1, and physical interference mounting features 25 connected to the thin base backing 24 via mounting apparatus connecting features 40. The passive suction apparatus 60 allow the bulletin board to the secured to a smooth flat mounting surface such as a refrigerator door, a tile wall or a window. The magnetic mounting apparatus 54 can allow the bulletin board to be mounted to a ferrous surface such as a refrigerator door, a steel wall or a ferrous metal door. The pressure sensitive adhesive mounting apparatus 54 can allow the bulletin board to be mounted to surfaces such as walls, doors, or windows. The interference mounting feature 25 can allow the bulletin board to be mounted to any surface or feature that allows positive engagement between the features such as nails or hooks in walls, hanging wire(s), lips, edges or pock features. The MCD holder anchor features 59 secure the free-mounting MCD holder 5 (FIG. 1) to the front of the bulletin board via the MCD holder anchor feature(s) 18 via physical interference such as a screw, bolt or pin. This allows different MCD holders 5 to potentially be integrated into the bulletin board to match the desired MCD operated by the user.

Figure 5:
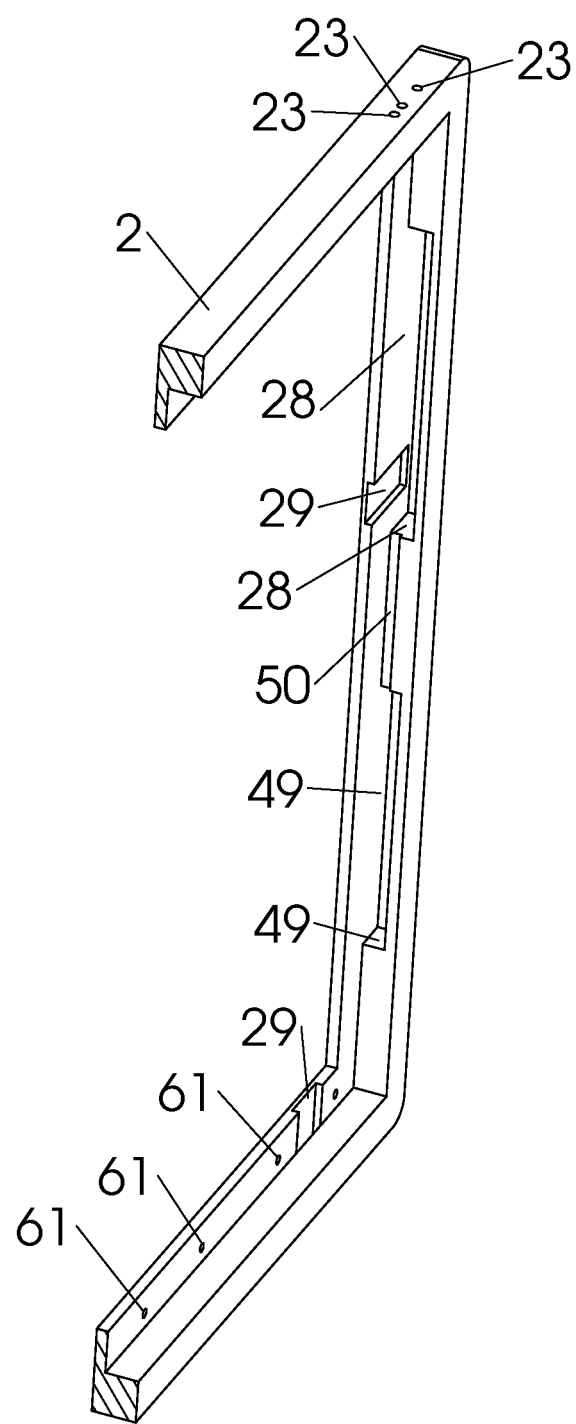
FIG. 5 is an isometric section view configuration of the framing wall.

With reference to FIG. 5, the isometric section view of the framing wall 2 includes control relief features 23 located at the top of the framing wall 2 above the MCD control button(s) 37 (FIG. 10) when a MCD 7 (FIG. 2) is mounted in the bulletin board. The control relief features 23 allow extended apparatus to manipulate input controls that would otherwise be obstructed or difficult to access due to bulletin board components such as the framing wall 2 (FIG. 2). In the case of control relief features 23, button extensions allow the MCD 7 (FIG. 2) to be manipulated from the top of the bulletin board's framing wall 2 (FIG. 2). The framing wall relief feature 28 (FIG. 14) creates a cavity and/or opening within the framing wall 2 for insertion and extraction of the MCD 7, and/or for granting space for the powered data connection hub 16 (FIG. 8a) to be contained within said cavity such that the powered data connection hub 16 can connect with the MCD 7 (FIG. 2) while allowing users' access to additional data hub communication ports 20 (FIG. 8b) of the bulletin board (FIG. 1).

The power cord routing relief 29 creates a cavity within the framing wall 2 granting space for the powered data connection hub cord 10 (FIGS. 8 and 1) to be routed such that the powered cord 10 (FIG. 8) is safely contained within the bulletin board. The utility device holder attachment feature 61 allows a screw, bolt, rivet or other securing apparatus to anchor the utility device holder 8 (FIG. 1) to the bulletin board; glue, epoxy or adhesive may also aid in securing the utility device holder 8.

The hand gesture module relief 49 and hand gesture module wire relief 50 create a cavity within the frame wall 2 granting space for the hand gesture module 52 (FIGS. 14 and 15) and hand gesture module wiring 53 (FIG. 15) to be contained within said cavity such that the hand gesture module 52 can be connected to the powered data connection hub 16 (FIG. 7), granting data communication to the MCD 7 (FIG. 1). The hand gesture module 52 (FIG. 15) allows the user to interact with and control the MCD 7 (FIG. 1) without touching the bulletin board and/or by customizable hand motions. Hand gesture sensing has many uses for control of the MCD with non-optimal hand conditions such as dirty hands without getting detritus on the bulletin board or while holding a coffee cup and a bag, or game play, control of lighting levels, or for the physically impaired or disabled.

Figure 15:
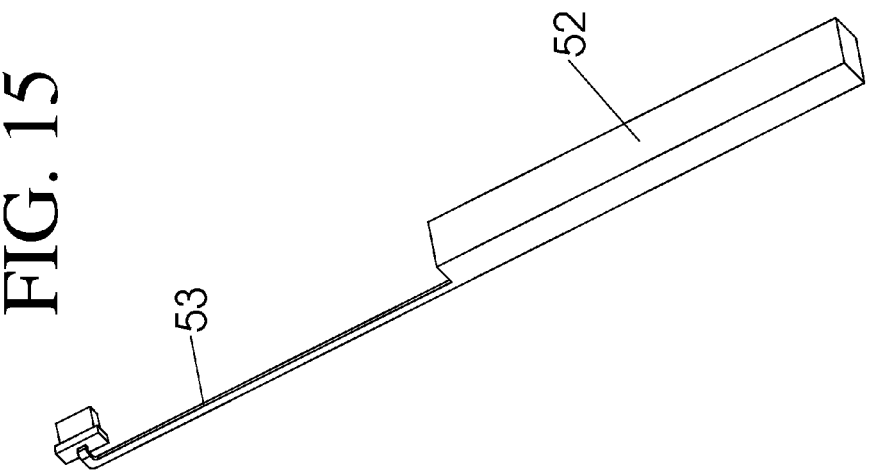
FIG. 15 is an isometric view configuration of a non-contact gesture sensing module and corresponding cabling for use with a combination bulletin board with MCD compartment.
Figure 14:
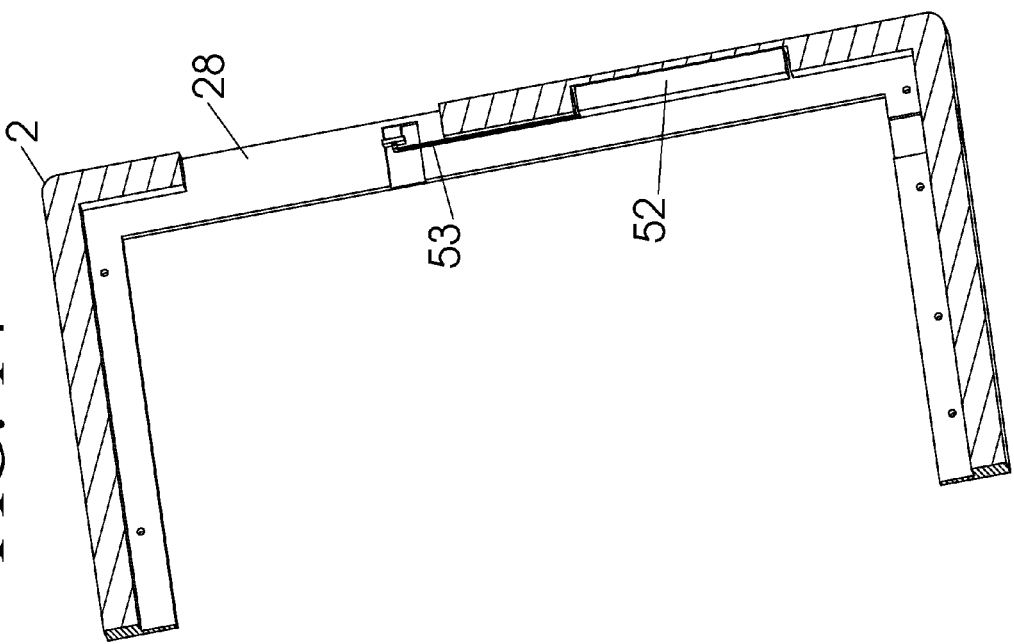
FIG. 14 is a frontal isometric section view configuration of a framing wall showing an integrated and otherwise hidden non-contact gesture sensing module and cable routing.

Illustrated in FIG. 14 is a partial cross section of the framing wall 2, the framing wall relief 28 enables MCD 7 insertion and extraction, and/or can house the powered data connection hub 16 (FIG. 8), the hand gesture module relief cavity 49 (FIG. 5), and the hand gesture module 52 with wiring and connector 53. Illustrates in FIG. 15 is the non-contact hand gesture module 52 and the hand gesture module cable 53 with plug allowing the hand gesture module to communicate to the data connection hub 16 and in turn the MCD 7.

Illustrated in FIGS. 8a and 8b is the powered data connection hub 16 that resides within the framing wall relief 28 (FIGS. 5 and 14) of the framing wall 2 (FIG. 5) and the corresponding connected components. The powered data connection hub 16 includes hub audio input/output ports 22, hub communication ports 20, and a hub power cord 10. The hub power cord 10 delivers DC electrical power to the data connection hub 16 which distributes power to all hub communication ports 20 for use by connected devices. Connected to the powered data connection hub 16 via the hub communication ports 20 are a RF communication dongle 45, a docking connector cable 41, and the hand gesture module cable 53 (FIG. 8b); these connected components augment the functionality of a MCD attached via the docking connector cable.

Using audio cables, the hub audio input/output ports 22 allow connectivity between the MCD 7 (FIG. 1) and outside devices such as external speakers, a microphone or MP3 player. The docking connector cable 41 allows data connectivity between the MCD 7 (FIG. 1) and the powered data connection hub 16, and by function of the connection hub 16, data connectivity to all hub communication ports 20 and the corresponding connected devices such as the hand gesture module 52, the RF communication dongle 45, and all other devices connected to the hub communication ports 20. An advantageous feature of the powered data connection hub 16 is the ability to provide power to its hub communication ports 20, allowing an attached MCD 7, a RF communication dongle 45, a hand gesture module 52 and other attached peripherals to be supplied power for functional operation.

Figure 11:
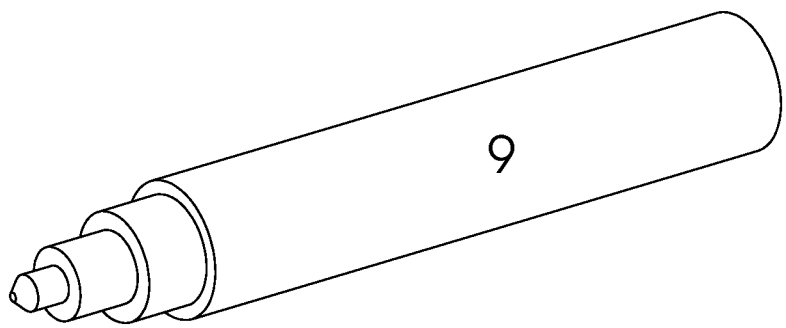
FIG. 11 is an isometric view of a writing utensil used with a combination bulletin board with MCD compartment.
Figure 12:
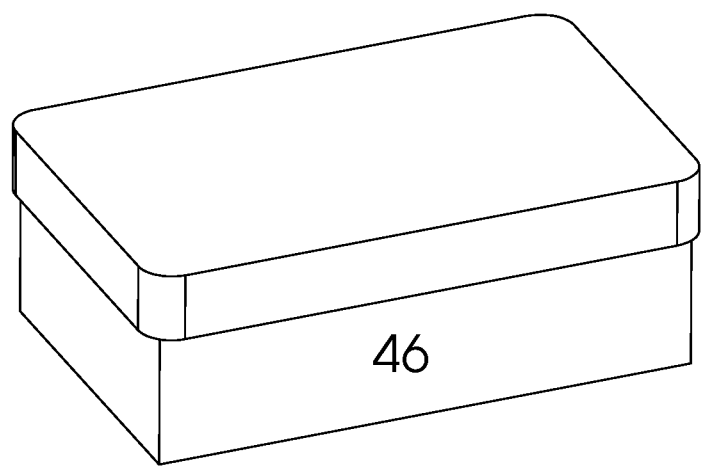
FIG. 12 is an isometric view of an erasing utensil used with a combination bulletin board with MCD compartment.

FIG. 11 illustrates an implementation of a writing utensil 9 used for marking upon a writing surface 4 (FIG. 1) for bulletin and drawing creation. FIG. 12 illustrates an implementation of an erasing utensil 46 used for removing written bulletins 11 on the writing surface 4. Both the writing utensil 9 and the erasing utensil 46 may be stored on the utility device holder 8.

Illustrated in FIG. 4 is the bulletin board with the thin base backing 24 (FIG. 3) removed to show the components sheltered within. The hub power cord 10 is shown routed from the powered data connection hub 16 behind the MCD holder system 5 (FIG. 2) and the writing surface 4 (FIG. 2), through the framing wall 2 via the power cord routing relief 29 and out the bottom of the bulletin board. The hub power cord 10 terminates at the power cord connector 44 which allows power sources to be connected to the bulletin board such as a DC power supply connected to a wall adapter, a battery pack, an external power generator such as a solar panel, or a power adaptor capable of converting AC power to DC power. It will be recognized that hub power cord 10 and power cord connector 62 do not need to extend outside of the bulletin board, and that power cord routing relief may be enlarged to contain said AC/DC power adaptor connected to said power cord connector 44.

Figure 10:
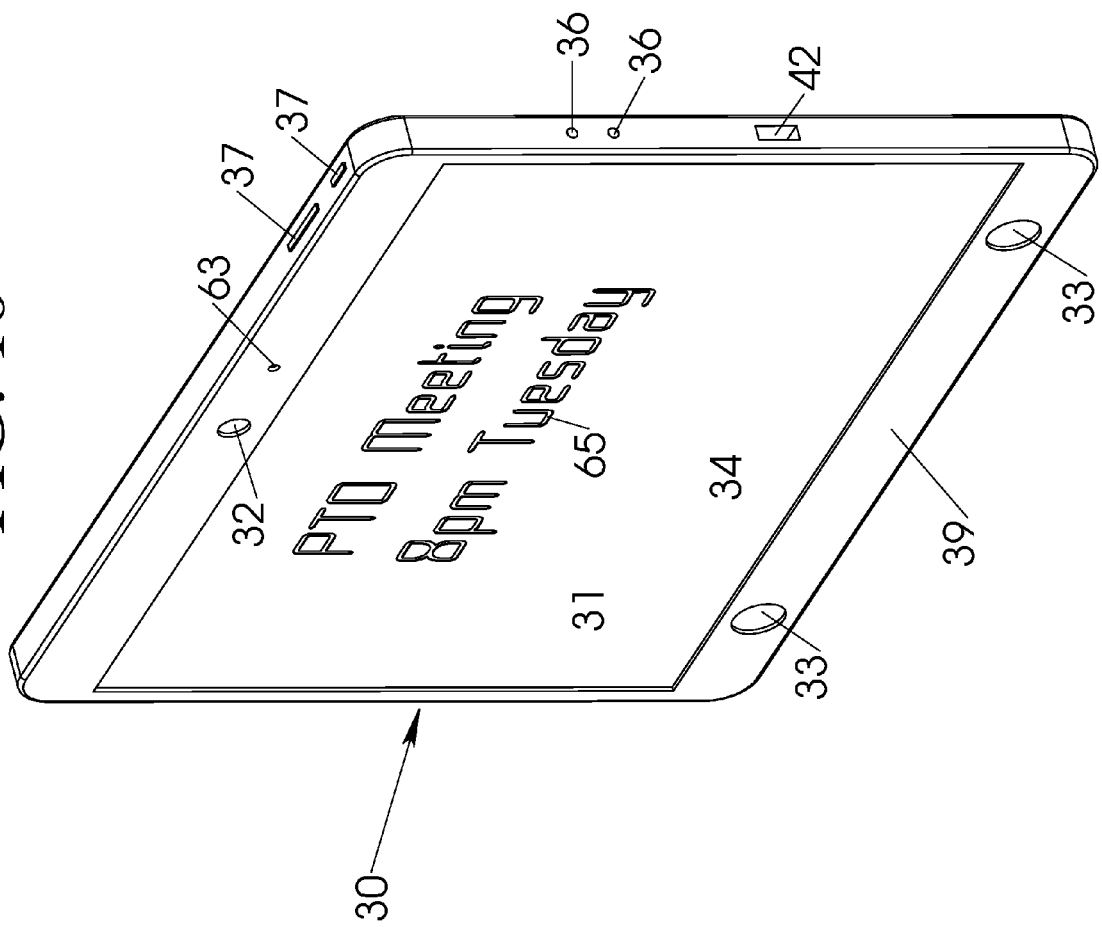
FIG. 10 is an isometric view of a mobile computing device (MCD) for use in a combination bulletin board with MCD compartment.

Illustrated in FIG. 10, the MCD 30 contained within the bulletin board is comprised of a MCD shell 39 acting as an external structure for the device which contain the MCD speakers 33, a MCD camera 32, a MCD microphone 63, at least a MCD control button 37, MCD audio input/output ports 36, a MCD docking port 42, and a MCD tactile interface 34 overlaying the MCD display screen 31. Electrical power and data communication are provided through the MCD docking port 42, allowing the MCD 30 to connect the powered data connection hub 16 via the docking connector cable 41, connecting the MCD 30 to other devices connected to the connection hub 16 such as the RF communication dongle 45, the hand gesture module 52, a smartphone, a MP3 player, a lighting module or other peripheral attachments. The MCD control buttons 37 allow the user to control MCD 30 functionality such as device power state and volume. The MCD speakers 33 generate sound for the device such as alerts, reminders, music, or audio from a communication call such as a phone or video call. The MCD camera 32 captures images for the MCD 30 such that an image or a stream of images may be captured, such as the image of a physical bulletin 12 held in front of the camera 32, allowing the image to be digitized and potentially communicated to other computing devices via a network, or video may be captured to conduct the necessary images required for video conferencing. The MCD microphone 63 captures audio of the surrounds of the bulletin board such that audio memos may be recorded for later playback, phone calls can be conducted, and audio for video can be captured to complete video conferencing between two computing devices. The MCD audio input/output ports 36 can connect to the powered data connection hub 16 using audio cables, or directly to an add-on speaker module 68 for improved audio playback, or a microphone add-on module 70 for improved audio capture and recording.

Illustrated in FIG. 16 is a combination traditional and digital message board system 1 having a modified writing surface 4 configuration with a decreased height such that a region of the thin base backing 24 reveals a region of the bulletin board capable of having add-on modules attached to the backing via the add-on mount features 67. The add-on mount features 67 are spaced at regular intervals allowing modules of different sizes, combinations and composition to be mounted to the bulletin board to augment the overall functionality and performance of the bulletin board. The add-on mount features 67 also allow 3rd Party add-on devices to developed, marketed, sold and attached to the bulletin board to enhance the customer experience of the bulletin board.

Figure 9:
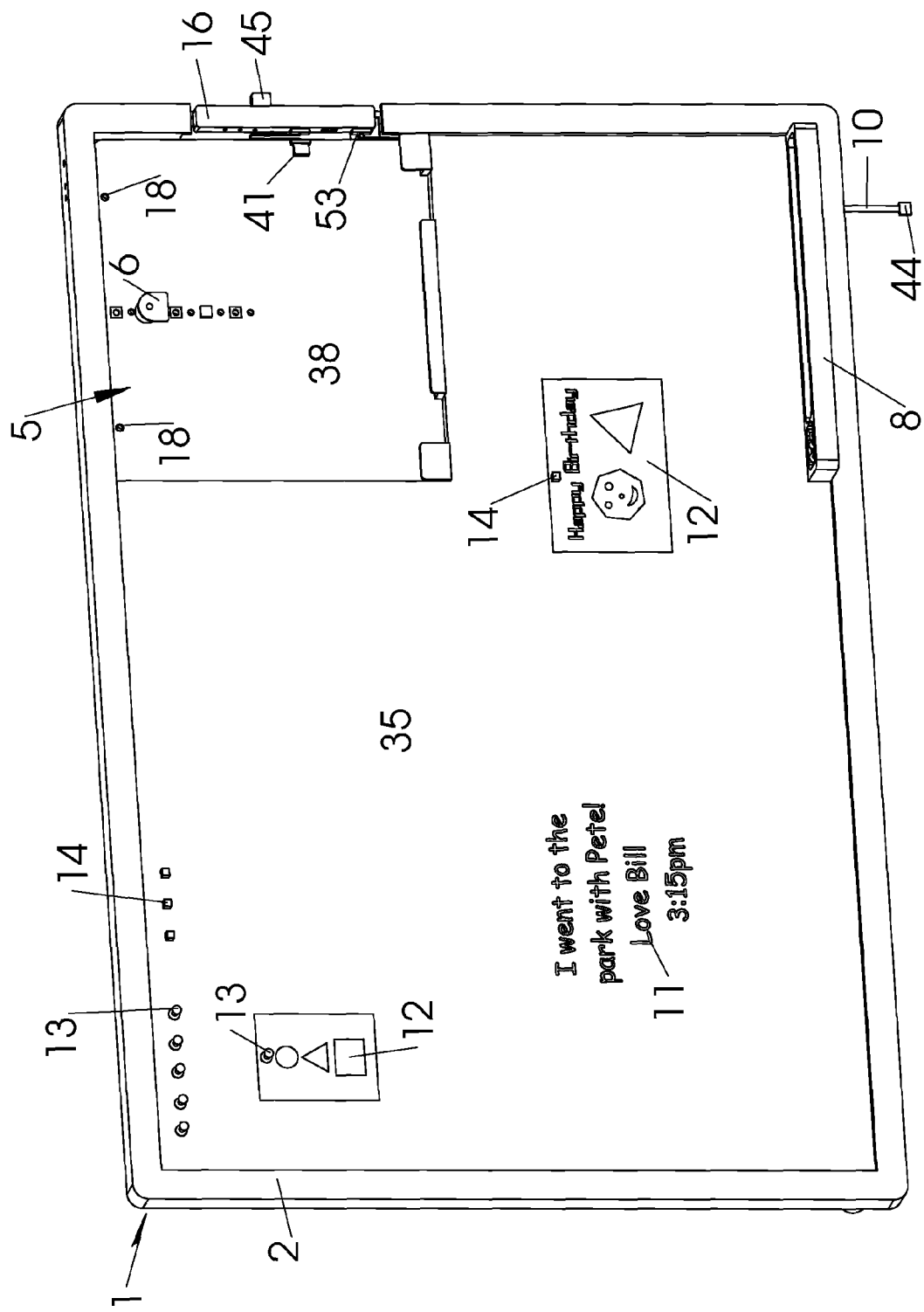
FIG. 9 is a partial cutaway isometric view configuration of combination bulletin board with MCD compartment having a surface of visual bulletin posting and view, a MCD holder, a utility holder and a powered docking hub.
Figure 17:
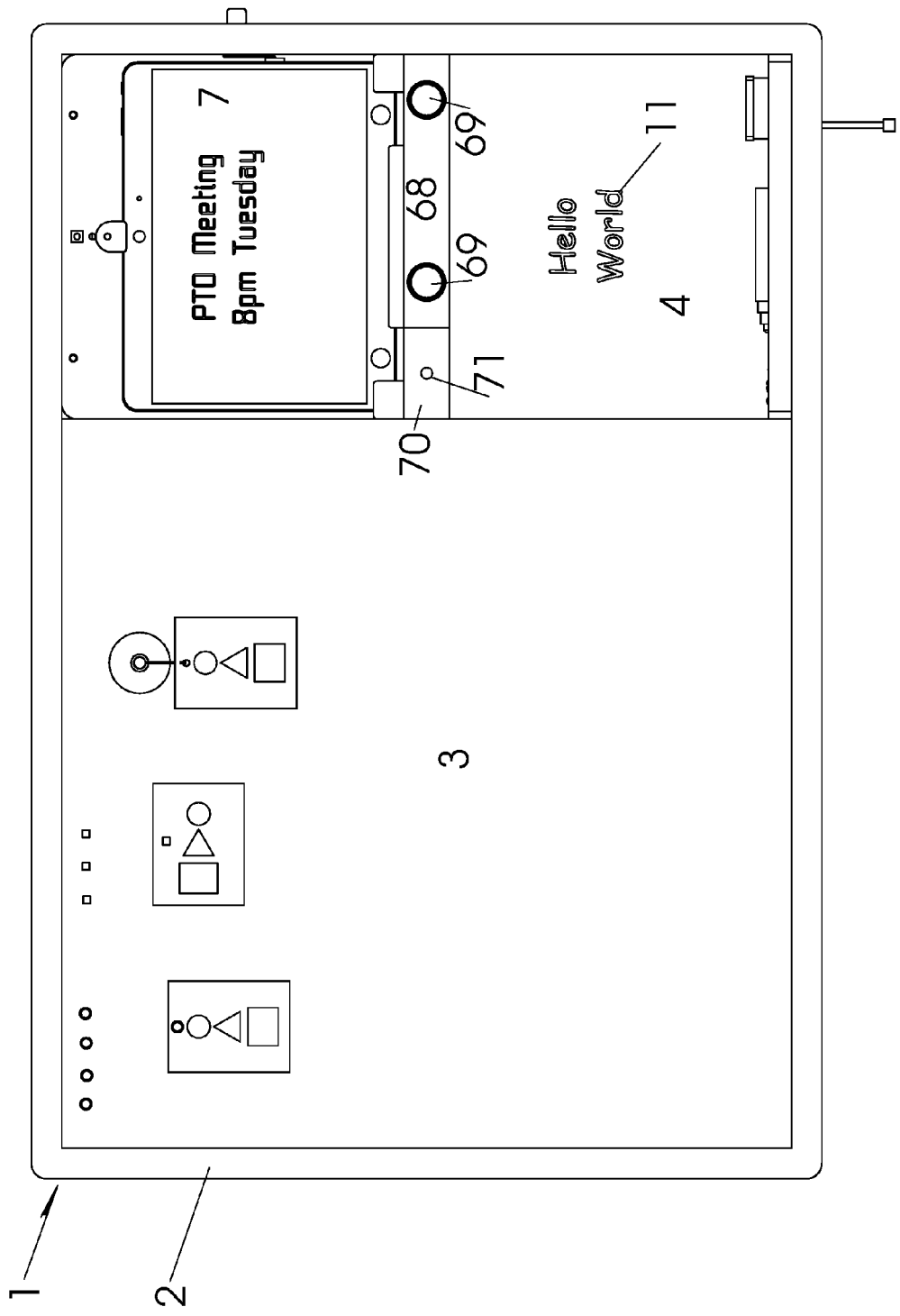
FIG. 17 is a front view configuration of a combination bulletin board with MCD compartment with a speaker and camera add-on module integrated into the system.
Figure 18:
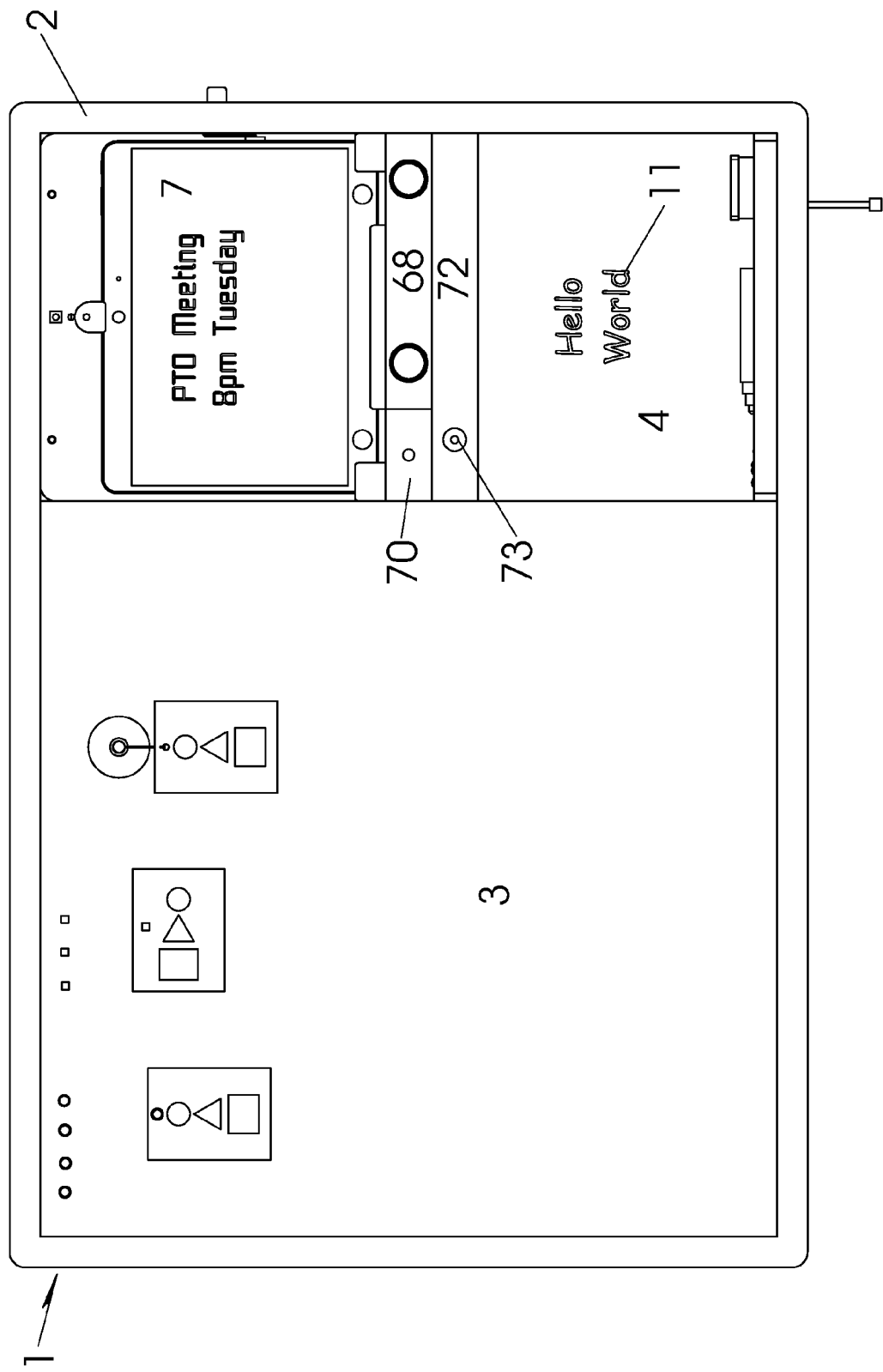
FIG. 18 is a front view configuration of a combination bulletin board with MCD compartment with a speaker, camera and projector add-on module integrated into the system.

Illustrated in FIGS. 17 and 18 are combination traditional and digital message board systems 1 having a modified writing surface 4 configuration enabling add-on modules 68, 70 and 72 to be attached to the bulletin board via add-on mount features 67 (FIG. 16) using mounting apparatus. Add-on modules 68, 70 and 72 are secured to the thin base backing above the writing surface 4, and below the MCD holder system 5 (FIG. 1) containing a MCD 7 capable of generating audio output and receiving audio input, and the powered data connection hub 16 (FIG. 9) digitally connected to said MCD 7 via the connector cable 41 (FIG. 9).

Figure 20A:
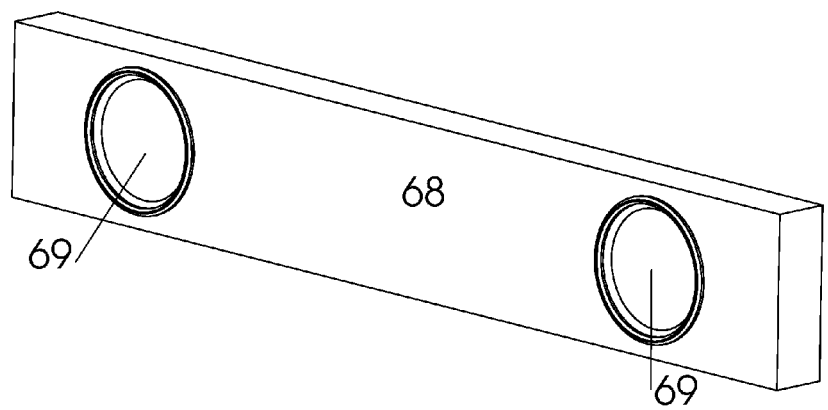
FIGS. 20a and 20b show two isometric view configurations of a speaker add-on module for use with a combination bulletin board with MCD compartment.
Figure 20B:
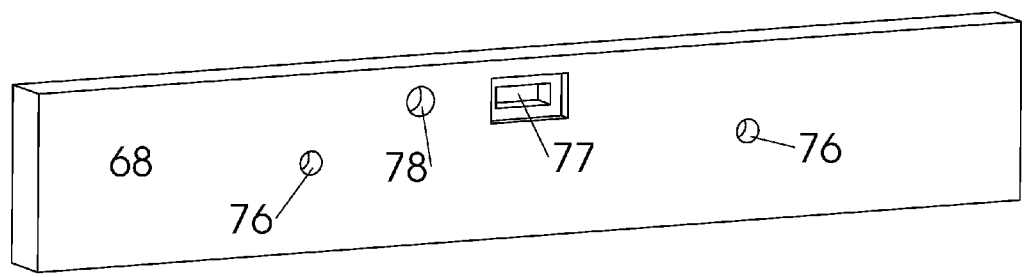

The speaker add-on module 68 (FIG. 20) contains speakers 69 for sound generation that are connected to an internal amplifier that receives power via the speaker module power connector 77 and is also functionally connected to the speaker signal input 78 port that is capable of having an audio input cable connected to said port. The speaker signal input 78 port can be functionally connected to either the MCD 7 (FIG. 17) via the MCD audio output port 36 (FIG. 10) or the powered data connection hub 16 (FIG. 8) via the hub audio output 22 port, allowing external audio signals to generate sound on the speakers via an external audio cable and an audio source such as a MP3 player, a phone, a CD player or other sound synthesizer. It is still further conceived that the speaker add-on module have an internal Bluetooth audio receiver module with audio output connected to said internal amplifier, allowing Bluetooth capable devices such as smartphones, laptops, Bluetooth repeaters or Bluetooth enabled MCDs to transmit an audio signal to the speaker add-on module wirelessly. The speaker add-on module 68 attaches to the thin base backing 24 (FIG. 16) via the speaker module mounting apparatus 76.

Figure 19A:
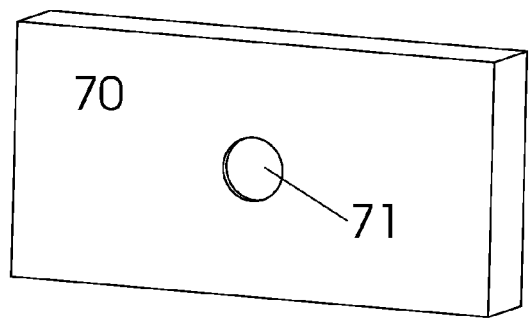
FIG. 19 (a, b, and c) show three isometric view configurations of a camera add-on module for use with a combination bulletin board with MCD compartment.
Figure 19B:
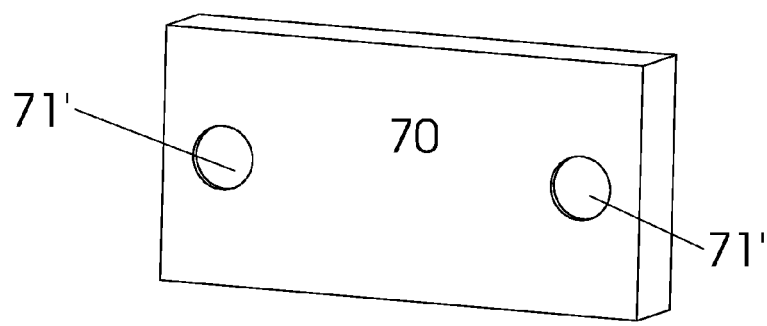
Figure 19C:
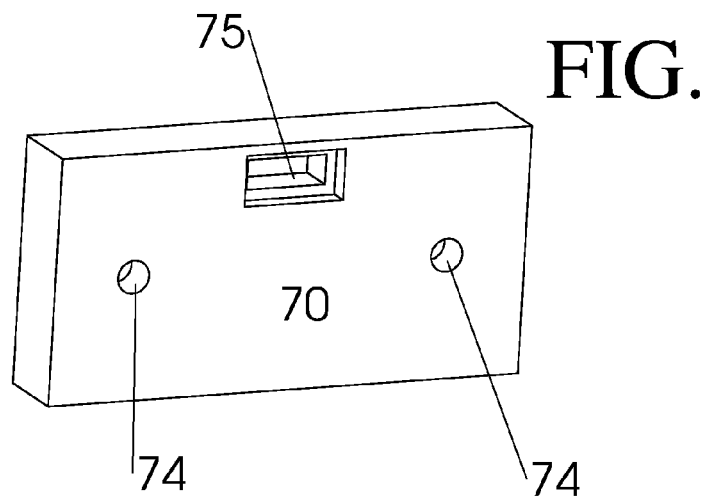

The camera add-on module 70 (FIG. 19) attaches to the thin base backing 24 (FIG. 16) by the add-on mount features 67 (FIG. 16) via the camera mounting apparatus 74, and is both digitally connected and powered through the camera data and power connection 75 port via a cable that connects to the powered data connection hub 16 (FIG. 8); thus coupling the camera add-on module to the MCD 7. The add-on camera 70 may contain one or two camera lens 71' (FIGS. 19*a* and 19*b*) that are capable of digitally capturing images and processing said images such that they may be transmitted to a user friendly interface such as software found on said connected MCD 7 via a data transmission method such as a cable connected to the camera data and power connection 75 port. The single lens camera add-on module is configured for standard image capture, and the dual lens camera add-on module may be configured to capture stereo images such that 3D image interpolation may be conducted by a processing module such that the captured image may be viewed in 3D, potentially by a holographic projector; this has use for 3D video phone communication between two locations, enabling a closer and more realistic connection between two locations for users.

The projector add-on module 72 (FIG. 21) attaches to the thin base backing 24 (FIG. 16) by the add-on mount features 67 (FIG. 16) via the projector mounting apparatus 79, and is both digitally connected and powered through the projector module data and power connection 80 port via a cable that connects to the powered data connection hub 16 (FIG. 8); thus coupling the projector add-on module 72 to the MCD 7. The projector add-on module 72 contains a projector lens 73 capable of projecting images generated within the module from data received from the projector module data connection port 80 upon surfaces. The projected images may be generated by LCD, LED, laser or other methods, and may be either a standard projected image, or a "3D image" capable of being observed using special viewing glasses or upon a specific surface. 3D projection display in junction with a 3D camera module enables a closer and more realistic connection between two locations for users.

Figure 22:
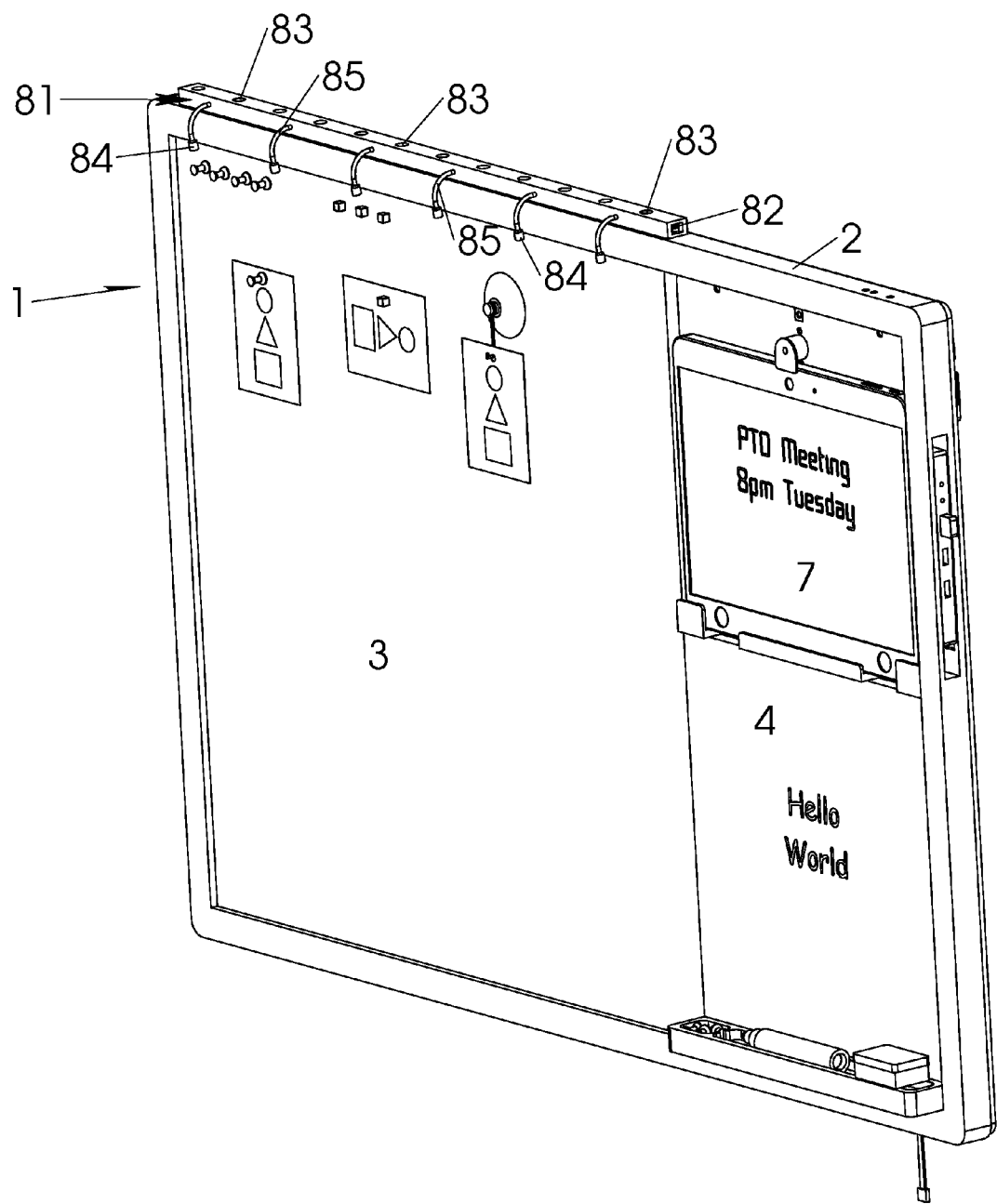
FIG. 22 is an isometric view configuration of a lighting add-on module for use with a combination bulletin board with MCD compartment.

Illustrated in FIG. 22 is a combination traditional and digital message board system 1 having a lighting add-on module 81 attached to the top of the framing wall 2 via a semi-permanent method such as tape, adhesive or a light duty glue between the two surfaces. The lighting add-on module 81 receives lighting data and power through the lighting module power and data connection 82 port capable of being coupled to powered data connection hub 16 (FIG. 8) via a cable, functionally connecting said lighting to the MCD 7. The lighting add-on module 81 contains semi-flexible bulletin lighting arms 85 projected from the module's front surface having bulletin lights 84 on the ends and curve downwards towards the surface of easy attachment 3 illuminating posted bulletins 12 (FIG. 2) for viewing in low light conditions. The lighting add-on module 81 also contains accent lights 83 projecting from the top of the module to augment the existing light in the area surrounding the combination traditional and digital message board system 1. The bulletin lighting level and accent lighting may be dynamically adjusted according to user defined parameters controlled by the MCD 7 such as time of day, calendar date, sensed ambient light level (via the MCD's built in camera 32 (FIG. 10)), or according to dynamic parameters such as new bulletin message status, weather, the stock market, school closings, E-Mail, trash day, user connection 'health', or a defined program assigned by the user. For example, at the start of the day, if the local weather indicates rain for the day, the accent lighting could project fading blue streaks upon the bulletin board's mounting surface, allowing the user to know to take an umbrella with them at a glance. A different geographical location could also be programmed into the device such that the user could know the current weather, for example, at their parent's house. Similarly, if a newly shared bulletins have arrived, a specified accent light correlated with a connected family member may softly pulse, allowing the user, at a glance, to know that bulletins from their cousin await their approval. Another example, if trash day is the following morning and the 'Take Out Trash!' task had not yet been checked 'Completed!', the accent lighting 83 may intermittently pulse brown and green while other digital bulletins are displayed to offer a supplementary reminder for the user. The bulletin lights 84 may adjust lighting intensity dependent upon time of day, sensed ambient light level, and a user chosen lighting profile for that window of time. It is also possible that the bulletin lighting arms may be manipulated to shin in different directions such as towards a user's face while conducting video chat, or sideways to better illuminate a dark hallway.

Figure 26:
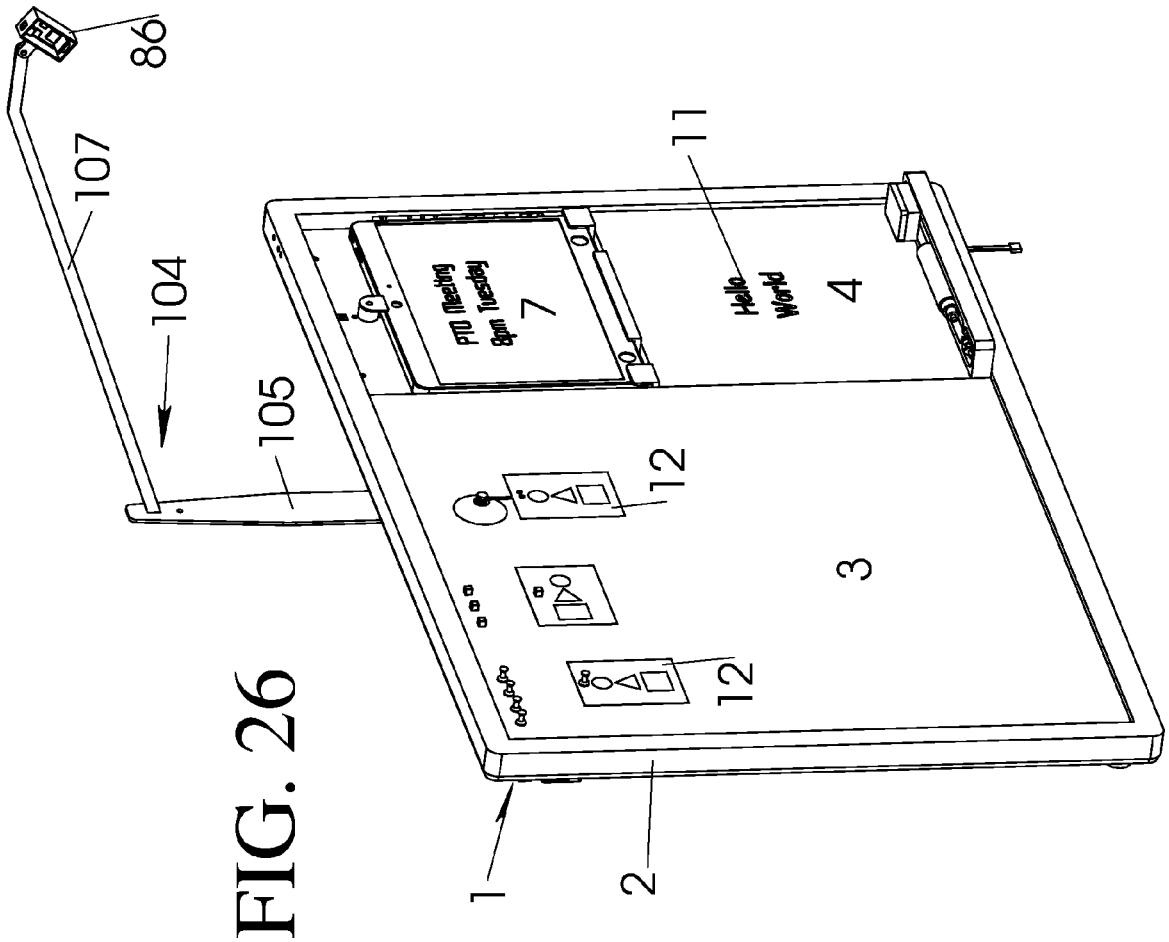
FIG. 26 is an isometric view configuration of a combination bulletin board with MCD compartment and capture camera arm assembly.

Illustrated in FIG. 26 is a combination traditional and digital message board system 1 with a capture camera arm assembly 104 attached to the upper back of the bulletin board. The capture camera 86 at the end of the extension arm 107 is capable of capturing a digital image of surface of visual bulletin posting and viewing 35 (FIG. 9) at defined regular intervals, transmitting the captured image to the MCD 7 which compares the new image to the prior image allowing any newly posted physical bulletins 11 and 12 to be determined via digital isolation, and optioned to be shared with other networked users.

Figure 25:
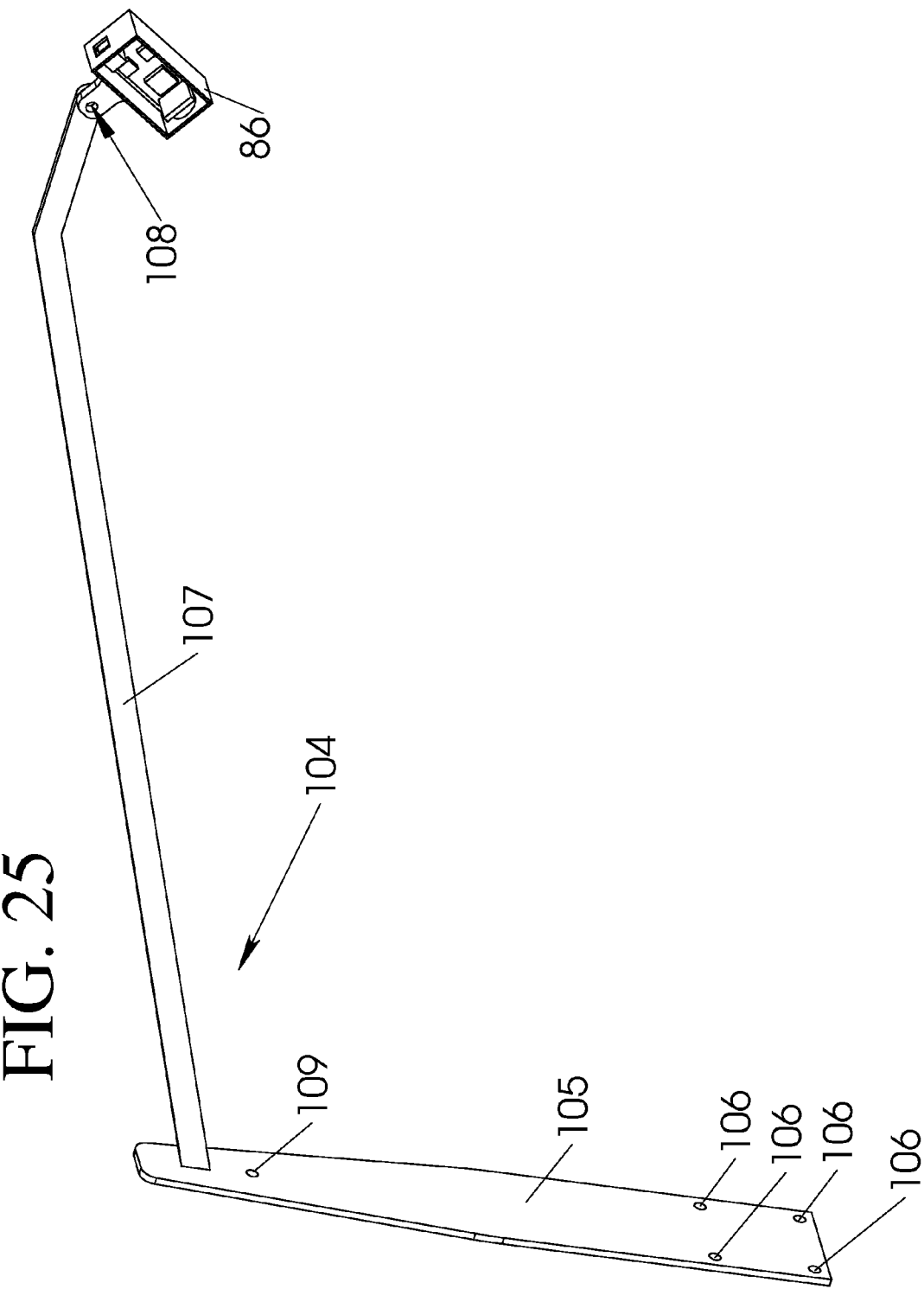
FIG. 25 is an isometric view configuration of a board image capture camera with extension arm for use with a combination bulletin board with MCD compartment.

Illustrated in FIG. 25 is the capture camera arm assembly 104 comprised of the camera extension arm base 105 that attaches to the extension arm anchor apparatus 110 (FIG. 3) on the thin base backing 24 (FIG. 3) by the extension base attachment holes 106, and potentially the mounting surface via the extension base mounting surface attachment hole 109. Protruding from the side of the camera extension arm base 105 not anchored to the thin base backing 24 (FIG. 3) is the extension arm 107 which projects upwards and away from the mounting surface, having the extension arm coupling apparatus 108 coupled to a capture camera 86 at the end furthest from the bulletin board.

Figure 23A:
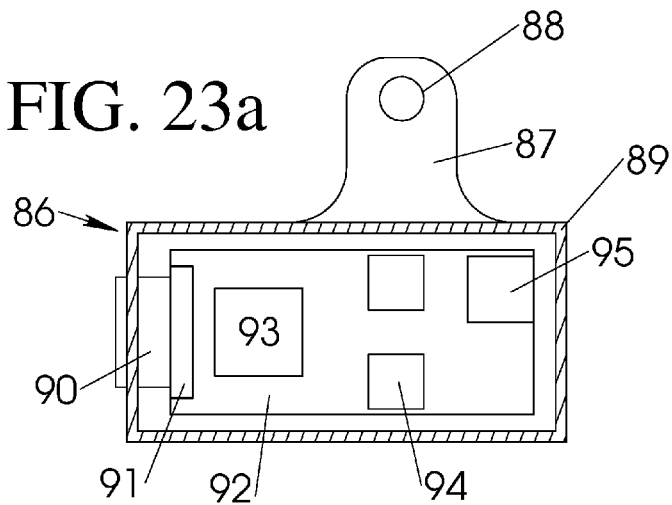
FIGS. 23a 23b and 23c show three section view configurations of a bulletin board image capture camera for use with a combination bulletin board with MCD compartment.
Figure 23B:
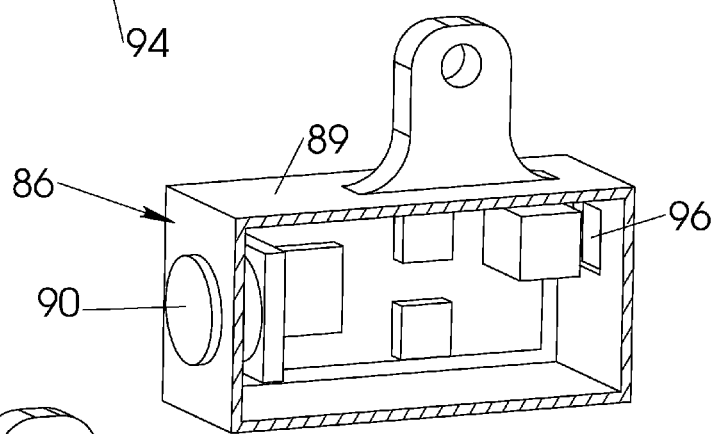

Three section view configurations of the capture camera 86 are shown in FIG. 23. FIG. 23*a* and FIG. 23*b* show a sectioned side view of the capture camera 86, comprised of capture camera body 89 with a capture camera mounting arm 87 projecting from the body's top that has a capture camera mounting hole 88 at the end of the protruding feature. A capture camera lens 90 pierces the front of the capture camera body 89, allowing images to be focused onto a capture camera CCD 91 that is mounted upon the capture camera PCB 92 that has a PCB CPU 93, a PCB auxiliary processor 94 and a PCB data and power connector 95 which allows connectivity via a cable through capture camera connector opening 96 to the powered data connection hub 16 (FIG. 8) and in turn the MCD 7 (FIG. 1).

Figure 23C:
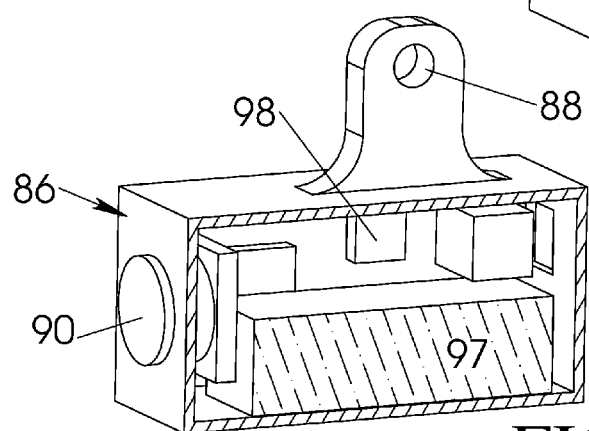

Illustrated in FIG. 23*c* is an alternative configuration of the capture camera 86 that is untethered and contains a capture camera battery 97 and a capture camera wireless module and antenna 98 that is capable of wirelessly transmitting data to the MCD 7 (FIG. 1).

Figure 24:
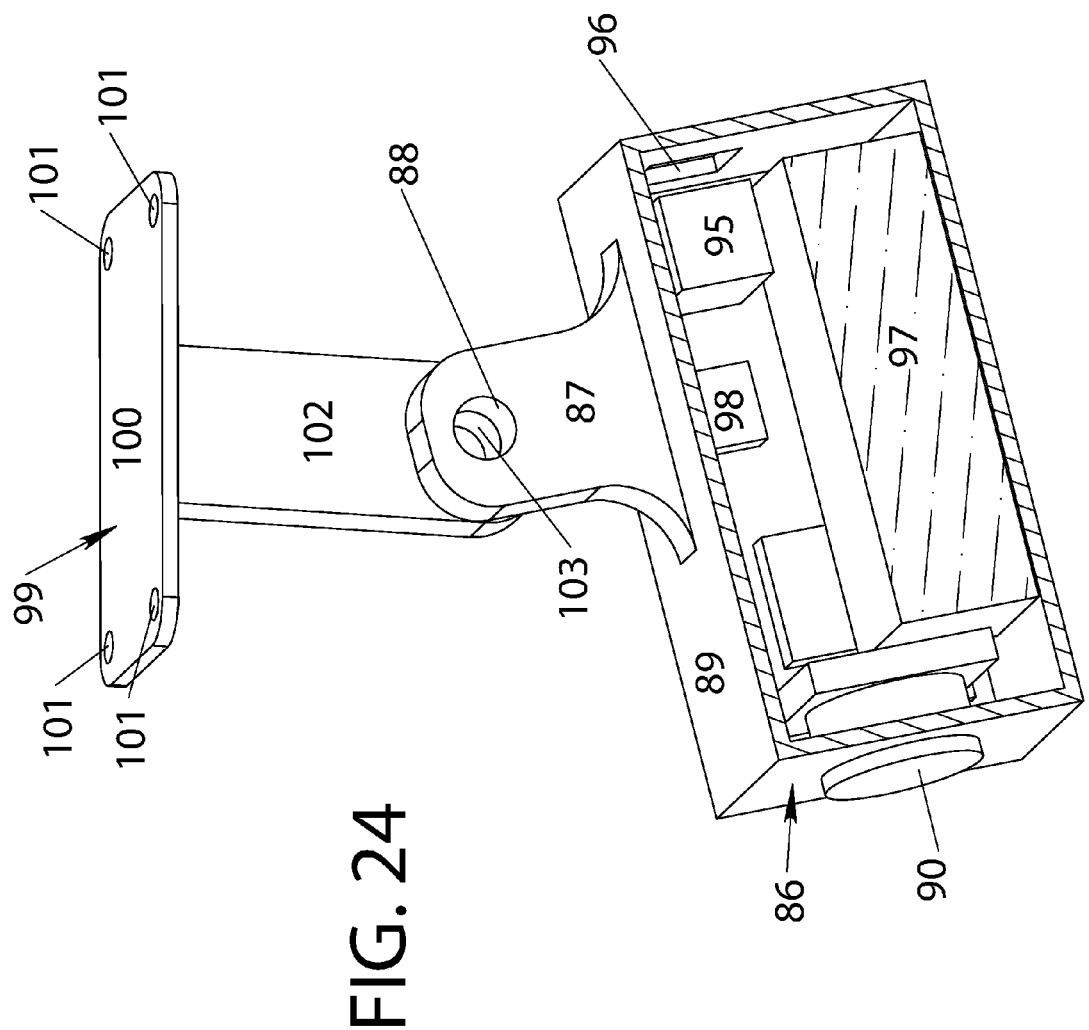
FIG. 24 is an isometric partial section view configuration of a board image capture camera with wall or ceiling mount base for use with a combination bulletin board with MCD compartment.

Illustrated in FIG. 24 is the untethered wireless capture camera 86 coupled to a capture camera surface mount 99 at the capture camera mount hole 88 and the capture camera mount coupler 103. The capture camera mount couple 103 is located at the end of the capture camera mount arm 102 that protrudes orthogonally from the capture camera mount base 100 that contains capture camera surface mount holes 101 used to attach the capture camera surface mount 99 to a ceiling or wall such that the capture camera 86 can acquire clear images of the surface of visual bulletin posting 35 and wirelessly transmit said images to the MCD 7 (FIG. 1) for processing.

Figure 27:
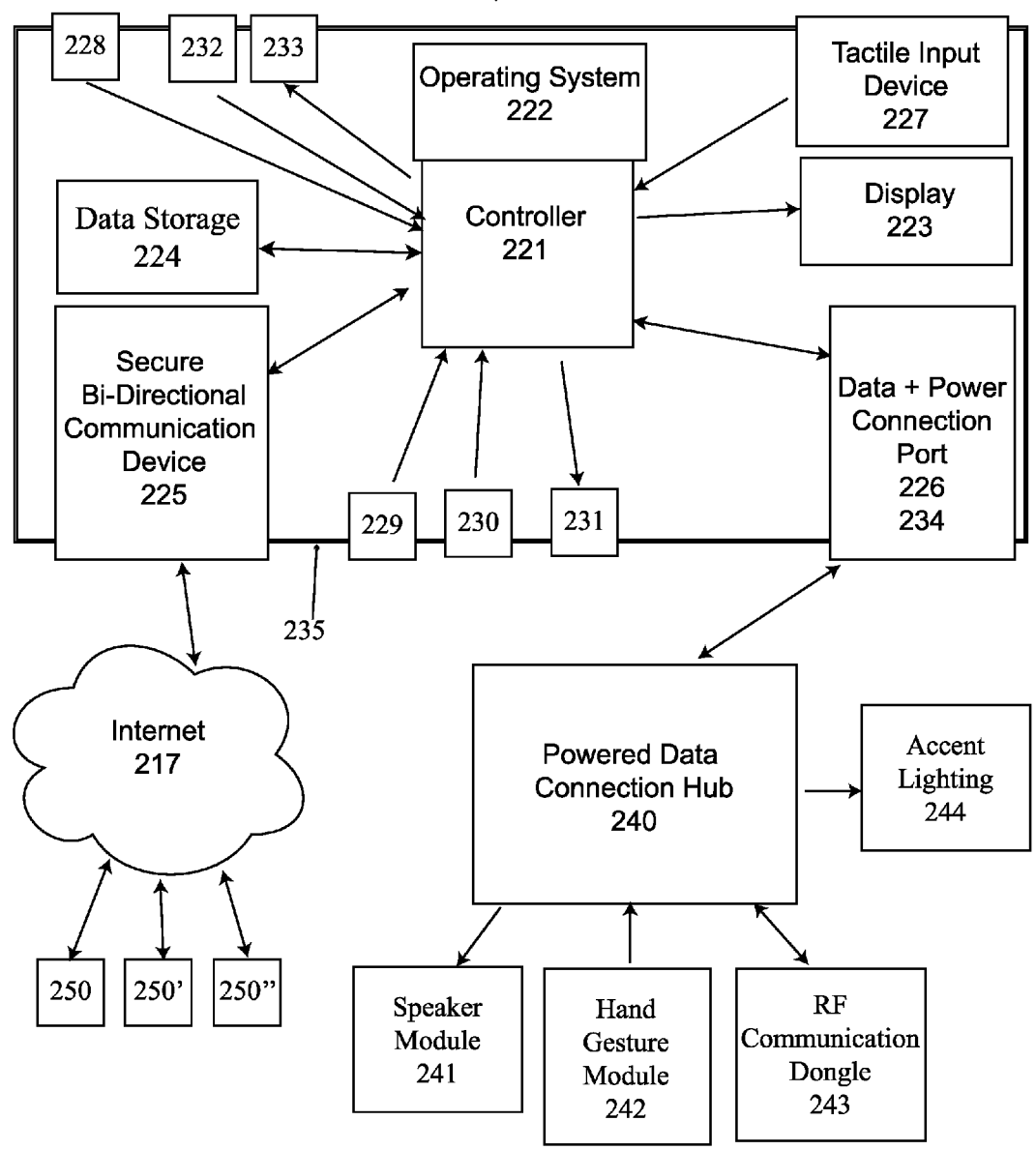
FIG. 27 is a block diagram of a configuration of the computing display system.

FIG. 27 illustrates a block diagram of the computing display system 220 for the combination traditional and digital message board system. The computing display system 220 contains a controller 221 running an operating system 222 that allows the controller 221 to functionally interface with the connected components of the computing display system 220. Contained within the computing display system 220, connected to the controller 221 is an electronic visual display device 223, a data storage device 224, a secure bidirectional communication device 225, a data connection port 226, a tactile input device 227, tactile inputs 228, an image capture device 229, an audio record device 230, an audio playback device 231, an audio input port 232, an audio output port 233, a power port 234 and a housing enclosure 235.

The controller 221 may comprise of any type of electronic programmable controller capable of executing operations necessary for a secure real-time operating system (OS) and custom software written for the OS, receiving and transmitting electronic data, for storage and receiving of data from a data storage module 224, displaying images and video on an electronic visual display device 223, processing and interpreting user inputs and interactions with tactile inputs from the tactile input device 227 and tactile inputs 228, communicating with external peripherals via the data connection port 226, capturing and recording video images via the image capture device 229, and audio recording and playback via the audio record device 230 and/or the audio input port 232 and the audio playback device 231 and/or the audio output port 233. The controller 221 can temporarily or permanently store data received from the secure bidirectional communication device 225 or data created via any input device within the controller data storage device 224 for future retrieval, modification and/or deletion such as the tactile input device 227, the image capture device 229, the audio record device 230 or other said peripheral devices. The controller 221 may transfer the data comprising a digital bulletin 65 (FIG. 10) from the controller data storage device 224 or received via the secure bidirectional communication device 225 to the visual display device 223, allowing digital bulletins 65 (FIG. 10) to be presented for users to view and potentially interact with via the tactile input device 227 or other add-on modules.

The secure bidirectional communication device 225 allowing the computing display system 220 to communicate with the internet 217 and other external computing devices 250, 250' and 250" such as other combination traditional and digital message board systems, desktop or laptop computers, smartphones or tablets.

The data connection port 226 that allows the computing display system 220 to transmit and receive data to and from other tethered devices such a data connection hub 240, allowing the computing display system 220 to functionally interface with peripheral add-on devices such as a speaker module 241, a hand gesture module 242, a RF communication dongle 243, accent lighting 244, or other connected peripherals.

FIG. 28 illustrates a digital signage social network system 200 for the combination traditional and digital message board system. The digital signage social network system 200 contains a plurality of computing display systems 212a, 212b, 212c each containing the content and connections described in FIG. 27. The computing display systems 212a, 212b, 212c are connected to the internet 217 via a network connection 218 granting connectivity to a server system 210. The server system 210 is comprised of a computer 209 configured as a web server 206, a database server 208 and an application server 207 that runs a digital signage management application. While the server system 210 is described in terms of several services and server functions, a single computer 209 may be configured to provide all functions and incorporate all described services. The computer 209 may be any commercially available server such as those manufactured and marketed by Lenovo, HP, Dell, Cisco Systems or other like products running a platform based upon the Windows, Mac OS X, UNIX-like operating system. The server system may also be "cloud based" such as services hosted by entities such as Amazon, Google, IBM and/or Microsoft. A workstation 211 allows administrators to manage the server system, and also allows creators to create content to be distributed to users via the social network system 200. Content from 3rd party providers such as information feeds 270, 270' 270" such as Twitter, Flickr, Tumblr, or other RSS or syndicated feeds may be polled by the application server 207 via the web server 206 and appropriately filtered according to user defined parameters.

The server system 210 is functionally connected to publishing client computing devices such as a tablet or computer 201a, 201b and 201c via network connections 218, and/or mobile smartphones 201d and 201e via a mobile network 219. Each publishing client computing device 201 runs a publishing client application 203 on the devices' CPU 202 which allows digital bulletins to be created, chosen and/or modified via the electronic visual display device and tactile input device 205 and/or via external devices 204.

The computing display devices 212 are connected to the internet 217 via a network connection 218 allowing secure bi-directional communication to the server system 210 for the sharing of information with other approved devices 201 and/or 212 connected to the network 200. The computing display devices 212 execute view controller software 214 via the devices' CPU 213 which allow digital bulletins 65 (FIG. 7) to be displayed and interacted with via the electronic visual display device and tactile input device 227; additional add-on modules 215 connected to the computing display devices' CPU 213 to enable enhanced user interaction.

It should be noted that both the publishing client computing devices 201 and the computing display devices 212 can both run the publishing client software 203 and the view control software 214 dependent on user preference for intended device functionality.

A user can access a pre-loaded assortment of individual and bundled media content including but not limited to photographic and digital images, graphic artwork, frames, standard and specialized fonts, video, audio made available by the service provider regarded to be of interest to the user and his/her private social network. Additionally, the service provider may regularly modify, enhance and update existing pre-loaded media content as well as suggest new content introduced periodically to the existing pre-loaded media collection. Using software publishing tools 203 (FIG. 28) provided by the service provider, the user may choose existing media content, modify, alter and/or customize existing pre-loaded media, or create new media content using their computing device 201 or computing display system 212 to assemble 'digital bulletins' to be presented on display devices 216 and 205.

The provided editing and assembly tools including the ability to adjust the size, layout, tone and arrangement and also to copy, duplicate and post media items to the electronic visual display 223 (FIG. 27) as well as archive or delete said media content from the server storage 208 (FIG. 28) as desired. Digital bulletin parameters for setting the display order, time and duration of media items may also be defined by user desired parameters. The user may add new content to the existing media collection at any time including virtually any data or information the user wants to display, retaining the aforementioned editing, modification, assembly and posting capabilities. Created media content that has been or is currently displayed may be collected in the user's resource or electronic media library for future modification, duplication and viewing on the electronic visual display 216 or 205.

In one implementation the electronic media library may be stored on the server storage 208. The user may access and select existing media items from the media library and also save new items to the media library on server storage 208. In this manner, any content accessed or modified from the media library may also be saved to the library in its revised or elaborated form. With the ability to use pre-existing and pre-loaded media content for display on the social digital signage system FIG. 28 the user may configure the software to update the media library automatically as made available. Notifications may also be configured so as to inform the user as new or modified pre-loaded media content is made available. Alternately, the user may configure the social digital signage system FIG. 28 and the media library on server storage 208 to be updated manually.

In another implementation, the controller 221 queries the server system 210 for media content to be run on the electronic visual display 216. The controller 221 may poll the server system 210 at preset intervals, e.g. every 10 minutes, such that the media library for display is updated automatically. Accordingly, diagnostics may be provided to alert both the user and the service provider if a query fails to meet its preset parameters, averting or minimizing "down time" experienced by the system. Along with preset update intervals, a user can select for the controller 221 to receive "push" updates including bi-directional communications containing new, retrieved or updated media content from a secure bi-directional communication device 225 (FIG. 27) to the controller 221 for display on the electronic visual display 216. Since the controller 221 downloads media items from the service provider storage via the internet 217 upon severance of a network connection, the controller 221 may continue to play electronic media items on the electronic visual display 7.

The social digital signage system FIG. 28 previously discussed, regarding a single electronic visual display 216, a single controller 221, and a single secure bi-directional communication device 225 may also accommodate for a plurality of said devices (220, 201, 212) of which multiple electronic visual displays 216 and 205 may be fixed in the same or different complexes and locations. The user has the same level of control of media items and the medial library as previously elaborated with the added capability of selecting the same or different media items and information to be displayed at said locations. Such processes may be configured automatically or manually by the user, from either a computing display system 212 or a computing device 201.

The host server system 210 may be used to store user information such as user identification, passwords, routing information, and user created media data, as well as pre-loaded media and electronic "bulletins" developed by the service provider such as created by a graphic designer and made available in the media library in the server storage 208. Said media content is created using software such as, for example but not limited to, Adobe Photoshop, Adobe Illustrator or Sketch and can be converted into the appropriate format for transmission over the internet 217.

While the present bulletin board has been described in connection with what are presently considered to be the most practical and preferred implementations, it is to be understood that the present bulletin board is not limited to the disclosed implementations. Rather it is intended to cover all of the various modifications and equivalent arrangements including within the spirit and scope of the appended claims.

It is contemplated, and will be apparent to those skilled in the art from the foregoing specification, drawings, and examples that modifications and/or changes may be made in the implementations of the bulletin board. Accordingly, it is expressly intended that the foregoing are only illustrative of preferred implementations and modes of operation, not limiting thereto, and that the true spirit and scope of the present bulletin board be determined by reference to the appended claims.

What is claimed is:

1. A combination bulletin board with compartment for an electronic device comprising:
   a unifying structural member;
   a mounting feature configured to attach the unifying structural member to a mounting surface;
   a first extruded section attached to a non-mounting surface side of the unifying structural member capable of having visual bulletins posted to the section's surface for display;
   a second section on the non-mounting surface side of the unifying structural member comprising an apparatus that enables a mobile computing device or an electronic display to be quickly attached and extracted for holding.

2. The combination bulletin board with compartment for an electronic device of claim 1, wherein the unifying structural member comprises at least one of the following:
   a substantially thin base member capable of having feature relief; or
   a raised framing wall encompassing the first and second sections, comprising relief features such that access to control elements and communication ports of the held mobile computing device remain unobstructed, accessible, and functional via button or knob extensions or recess or hole features.

3. The combination bulletin board with compartment for an electronic device of claim 1, wherein the mounting feature comprises at least one of the following:
   a recess, thru hole or protrusion capable of accepting mechanical interference with the mounting surface,
   an adhesion surface allowing the unifying structural member to be bonded to the mounting surface,
   a magnetic surface capable of creating an attractive force towards a ferrous mounting surface,
   a feature or apparatus which can clamp or expand upon the mounting surface such that a holding force is generated, or
   a suction device that creates a pressure differential such that a holding force is generated.

4. The combination bulletin board with compartment for an electronic device of claim 1, wherein the first extruded section comprises one or more materials enabling at least one of the following:
   attachment of physical objects/bulletins via at least one of the following:
   interference, comprising at least one of pegs, tacks, pins, nails, walls/surface, hook+loop,
   adhesion, comprising at least one of glue, tape, sticky tack, paste, van der Waals force,
   magnetism,
   compression/binding/expansion, or
   suction;
   writing of text based messages or the drawing of glyphs on at least one of the following:
   an erasable surface that is unpowered or powered,
   a removable surface or replaceable surface, or
   a surface which enables visibly coherent overlay graphic composition.

5. The combination bulletin board with compartment for an electronic device of claim 4 wherein the first extruded section comprises one or more subsections of the one or more materials.

6. The combination bulletin board with compartment for an electronic device of claim 1, where the mobile computing device or electronic display is held by at least one of the following:
   physical interference, including at least one of a case capable of containing the mobile computing device or a hook+loop,
   adhesion,
   magnetism,
   a feature which can clamp or expand such that a holding force is generated, or
   passive suction device.

7. The combination bulletin board with compartment for an electronic device of claim 1, comprising:
   a third extruded section attached to the non-mounting surface side of the unifying structural member capable of holding instruments or devices.

8. The combination bulletin board with compartment for an electronic device of claim 7, the instruments or devices including at least one of:
   writing utensils,
   erasing utensils,
   magnets,
   pins/tacks, or
   suction cups.

9. The combination bulletin board with compartment for an electronic device of claim 1, further comprising:
   an extruded section attached to the unifying structural member, capable of housing add-on devices.

10. The combination bulletin board with compartment for an electronic device of claim 9, the add-on devices including at least one of:
    a phone holder,
    a battery module,
    a scarf or clothing hook, or
    a container capable of holding keys, trinkets, or other small personal items.

11. A combination bulletin board with compartment for an electronic device comprising:
    a unifying structural member;
    a mounting feature capable of attaching the unifying structural member to a mounting surface;
    a first extruded section attached to a non-mounting surface side of the unifying structural member capable of having visual bulletins posted to the section's surface for display;
    a second section on the non-mounting surface side of the unifying structural member comprising an apparatus that enables a mobile computing device or electronic display to be quickly attached and extracted for holding, and
    a docking connector capable of providing power.

12. The combination bulletin board with a compartment for an electronic device as recited in claim 11, wherein the unifying structural member comprises at least one of the following:
    a substantially thin base member capable of having feature relief,
    a raised framing wall encompassing the first and second sections, capable of having relief features such that access to the control elements and communication ports of the mobile computing device remain unobstructed or fully accessible and functional via button or knob extensions, recess or hole features, or feature relief for power and data cable.

13. The combination bulletin board with a compartment for an electronic device of claim 11, wherein the first extruded section comprises one or more materials enabling one or more of the following:
    attachment of physical objects/bulletins via at least one of the following:
    interference, including at least one of pegs, tacks, pins, nails, walls/surface, or hook+loop,
    adhesion, including at least one of glue, tape, sticky tack, paste, van der Waals force,
    magnetism,
    compression/binding/expansion, or
    suction;
    writing of text based messages or the drawing of glyphs on at least one of the following:
    an erasable surface that is unpowered or powered,
    a removable surface or replaceable surface, or
    a surface which enables visibly coherent overlay graphic composition.

14. The combination bulletin board with compartment for an electronic device of claim 13 wherein the first extruded section comprises one or more subsections of the one or more materials.

15. The combination bulletin board with a compartment for an electronic device of claim 11, wherein the mobile computing device or electronic display is held by one or more of the following:
    physical interference, including at least one of a case capable of containing the mobile computing device or a hook+loop,
    adhesion,
    magnetism,
    a feature which can clamp or expand such that a holding force is generated, or
    a suction device.

16. The combination bulletin board with a compartment for an electronic device of claim 11, wherein the docking connector is coupled to powered docking hub comprising at least the following:
    a power input port connected to a voltage supply generated by at least one of the following:
    an AC wall source;
    an DC wall source;
    a removeable battery source;

an external DC power source, including a least one of a solar panel or generator; or inductive charging; and at least a data connection port capable of supplying power and data communication to at least one external device.

17. The bulletin board of claim 16, wherein the docking hub is configured for interfacing with communication modules capable of data transfer with communication protocols including at least one of:

WiFi,

Bluetooth,

Zigbee,

ZWave Plus, or a protocol operating in another RF band.

18. The combination traditional and digital message board system of claim 11, comprising a section of the unifying structural member allocated for the attachment of one or more add-ons.

19. The combination traditional and digital message board system of claim 18, the one or more add-ons including at least one of:

a phone holder;

a battery module;

a scarf or clothing hook;

a container capable of holding keys, trinkets, or other small personal items;

a lighting module capable of at least illuminating the physical bulletins to improve viewing, providing accent lighting to the surrounding environment, or disseminating information on board status;

a speaker module capable of audio playback from at least a physical cable and a RF signal;

a microphone capable of outputting its recorded signal to at least a physical cable and a RF signal, at least a camera capable of outputting captured images to at least a physical cable and a RF signal, a non-contact hand gesture recognition device capable of outputting data via at least a physical cable and a RF signal; and an apparatus capable of projecting images onto surfaces.

20. The combination bulletin board with a compartment for an electronic device of claim 11 configured for interface control via at least one of the following:

a non-contact gesture based input control module, voice interaction, proximity detection, ambient lighting level, ambient noise level, or capacitive or other EM field sensing.

* * * * *